United States Patent
Hirata

(10) Patent No.: US 11,448,921 B1
(45) Date of Patent: Sep. 20, 2022

(54) LIQUID CRYSTAL DISPLAY DEVICE COMPRISING A VERTICAL ALIGNMENT-TYPE LIQUID CRYSTAL LAYER AND A PLURALITY OF PIXELS EACH INCLUDING A FIRST, SECOND, THIRD, AND FOURTH LIQUID CRYSTAL DOMAIN

(71) Applicant: SHARP KABUSHIKI KAISHA, Sakai (JP)

(72) Inventor: Mitsuaki Hirata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/711,783

(22) Filed: Apr. 1, 2022

Related U.S. Application Data

(60) Provisional application No. 63/171,842, filed on Apr. 7, 2021.

(51) Int. Cl.
  *G02F 1/1337* (2006.01)
  *G02F 1/1343* (2006.01)

(52) U.S. Cl.
  CPC .. *G02F 1/133707* (2013.01); *G02F 1/133753* (2013.01); *G02F 1/134336* (2013.01)

(58) Field of Classification Search
  CPC ................ G02F 1/133757; G02F 1/133776
  See application file for complete search history.

(56) References Cited

U.S. PATENT DOCUMENTS

| | | |
|---|---|---|
| 2003/0043336 A1 | 3/2003 | Sasaki et al. |
| 2013/0101755 A1 | 4/2013 | Lee et al. |
| 2013/0114029 A1* | 5/2013 | Shoraku ............... G02F 1/1337 349/110 |
| 2014/0253851 A1 | 9/2014 | Takano et al. |
| 2017/0205670 A1* | 7/2017 | Hirata ............... G02F 1/133788 |
| 2018/0284544 A1 | 10/2018 | Shimoshikiryoh et al. |
| 2019/0146284 A1* | 5/2019 | Bae .................. G02F 1/133707 349/139 |
| 2019/0227386 A1* | 7/2019 | Mizusaki .......... G02F 1/133723 |
| 2019/0302542 A1* | 10/2019 | Shimoshikiryoh ......................... G02F 1/133707 |

(Continued)

FOREIGN PATENT DOCUMENTS

| | | |
|---|---|---|
| JP | 2003-149647 A | 5/2003 |
| JP | 2009-282059 A | 12/2009 |

(Continued)

*Primary Examiner* — Paul C Lee
(74) *Attorney, Agent, or Firm* — ScienBiziP, P.C.

(57) ABSTRACT

A liquid crystal display device includes a first substrate, a second substrate, and a vertical alignment-type liquid crystal layer. The first substrate includes source lines and pixel electrodes. A pixel includes first, second, third and fourth liquid crystal domains. The pixel electrode has slits formed therein. The first substrate further includes a shield common electrode. The shield common electrode is located between the source lines and the pixel electrodes. The shield common electrode includes a solid portion overlapping the source lines and one end portion and the other end portion, in a row direction, of the pixel electrode, and also includes a first cutout portion formed across regions corresponding to the first, second, third and fourth liquid crystal domains in each pixel, the first cutout portion including portions overlapping the slits.

12 Claims, 24 Drawing Sheets

(56) References Cited

U.S. PATENT DOCUMENTS

| | | |
|---|---|---|
| 2020/0218121 A1 | 7/2020 | Hirata |
| 2020/0241337 A1 | 7/2020 | Shimoshikiryoh et al. |
| 2021/0318580 A1 | 10/2021 | Hirata et al. |

FOREIGN PATENT DOCUMENTS

| | | |
|---|---|---|
| JP | 2011-133910 A | 7/2011 |
| JP | 2013-088803 A | 5/2013 |
| JP | 2014-174402 A | 9/2014 |
| JP | 2015-049392 A | 3/2015 |
| WO | 2017/047532 A1 | 3/2017 |
| WO | 2017/057210 A1 | 4/2017 |
| WO | 2018/138888 A1 | 8/2018 |
| WO | 2020/044557 A1 | 3/2020 |

\* cited by examiner

ON THE ACTIVE MATRIX SUBSTRATE SIDE

ON THE COUNTER SUBSTRATE SIDE

EXAMPLE 1

COMPARATIVE EXAMPLE

ON THE ACTIVE MATRIX SUBSTRATE SIDE

ON THE COUNTER SUBSTRATE SIDE

LIQUID CRYSTAL LAYER

EXAMPLE 4

EXAMPLE 5

EXAMPLE 7

LIQUID CRYSTAL DISPLAY DEVICE COMPRISING A VERTICAL ALIGNMENT-TYPE LIQUID CRYSTAL LAYER AND A PLURALITY OF PIXELS EACH INCLUDING A FIRST, SECOND, THIRD, AND FOURTH LIQUID CRYSTAL DOMAIN

BACKGROUND

1. Technical Field

The present disclosure relates to a liquid crystal display device.

2. Description of the Related Art

As a technique to improve the viewing angle characteristics of liquid crystal display devices of the VA (Vertical Alignment) mode, an alignment division structure is known, in which a plurality of liquid crystal domains are formed in one pixel. As methods for forming the alignment division structure, the 4D-RTN (4Domain-Reverse Twisted Nematic) mode and the 4D-ECB (4Domain-Electrically Controlled Birefringence) mode have recently been proposed.

A liquid crystal display device of the 4D-RTN mode is disclosed in, for example, International Publication No. 2010/138888 (Patent Document 1). A liquid crystal display device of the 4D-ECB mode is disclosed in, for example, International Publication No. 2017/057210 (Patent Document 2). In the 4D-RTN mode and the 4D-ECB mode, a 4-domain structure is formed by defining pretilt directions of liquid crystal molecules by alignment films. Namely, when a voltage is applied to a liquid crystal layer, four liquid crystal domains are formed in one pixel. Such a 4-domain structure is occasionally referred to simply as a "4D structure". In a liquid crystal display device of the 4D-RTH mode, the pretilt direction defined by one of a pair of alignment films and the pretilt direction defined by the other of the pair of alignment films are different from each other by about 90 degrees. Therefore, the liquid crystal molecules exhibit a twist alignment in the presence of a voltage. By contrast, in a liquid crystal display device of the 4D-ECB mode, the pretilt direction defined by one of a pair of alignment films and the pretilt direction defined by the other of the pair of alignment films are antiparallel to each other, and the liquid crystal molecules do not exhibit a twist alignment in the presence of a voltage.

Patent Documents 1 and 2 each disclose a structure in which a region, of a pixel electrode, that corresponds to each of liquid crystal domains has silts formed therein extending generally parallel to the director of the corresponding liquid crystal domain. Formation of such slits may stabilize the alignment of the liquid crystal molecules and thus improve the transmittance of the liquid crystal display device.

For the purpose of improving the response characteristics of a liquid, crystal display device of the VA mode, a technology referred to as the "Polymer Sustained Alignment" (occasionally referred to as the "PSA technology") has been developed (see, for example, Japanese Laid-Open Patent Publication No. 2003-149647 (Patent Document 3)). The PSA technology is as follows. A photopolymerisable monomer is incorporated into in a liquid crystal material in advance. After a liquid crystal cell is produced, the photopolymesizable monomer is polymerized in a state where a voltage is applied to a liquid crystal layer. As a result, an alignment sustaining layer ("polymer layer") is formed. The alignment sustaining layer provides the liquid crystal molecules with a pretilt. The distribution and the strength of the electric field to be applied to polymerize the monomer may be adjusted, so that the pretilt directions (and pretilt angles) of the liquid crystal molecules are controlled.

Japanese Laid-Open Patent Publication No. 2003-149647 also discloses a structure that uses a pixel electrode having a microscopic slit pattern (also referred to as a "fishbone structure") in addition to the PSA technology. With such a structure, when a voltage is applied to the liquid crystal layer, the liquid crystal molecules are aligned parallel to a longitudinal direction of the slits.

Japanese Laid-Open Patent Publication No. 2015-49392 (Patent Document 4) discloses an electric field shield technology, by which a transparent shield electrode provided with a potential equal to that of a common electrode is legated between a source line and a pixel electrode. This technology may decrease the parasitic capacitance between the source line and the pixel electrode, and therefore, may improve the numerical aperture. In this specification, the above-described shield electrode will be referred to as a "shield common electrode".

(Citation List)
(Patent Documents)

[Patent Document 1] International Publication No. 2018/138888

[Patent Document 2] International Publication No. 2017/057210

[Patent Document 3] Japanese Laid-Open Patent Publication No. 2003-149647

[Patent Document 4] Japanese Laid-Open Patent Publication No. 2015-49392

SUMMARY

The studies made by the present inventor have found out that none of a liquid crystal display device of the 4D-RTN mode, a liquid crystal display device of the 4D-ECB mode and a liquid crystal display device using the PSA technology has a sufficiently high transmittance in the case where a pixel electrode having slits formed therein and a shield common electrode are used in combination. A conceivable reason for this is that the alignment of the liquid crystal molecules on the slits is prevented by the potential of the shield common electrode.

The present invention made in light of the above-described described problem has an object of sufficiently improving the transmittance of a liquid crystal display device of the 4D-RTN mode, a liquid crystal display device of the 4D-ECB mode and a liquid crystal display device using the PSA technology while a pixel electrode having slits formed therein and a shield common electrode are used in combination.

This specification discloses a liquid crystal display device defined in the following items.

[Item 1]

A liquid crystal display device, including:

a first substrate and a second substrate facing each other; and a vertical alignment-type liquid crystal layer provided between the first substrate and the second substrate, wherein the liquid crystal display device includes a plurality of pixels arrayed in a matrix including a plurality of rows and a plurality of columns, wherein the first substrate includes a plurality of gate lines extending in a row direction, a plurality of source lines extending in a column direction, a pixel electrode provided in each of the plurality of pixels, and a first alignment film provided between the pixel electrode and the liquid crystal layer, wherein the second substrate includes a common electrode facing the pixel electrode, and a second alignment film provided between the common electrode and the liquid crystal layer, wherein the plurality of pixels each include a first liquid crystal domain, a second liquid crystal domain, a third liquid crystal domain and a fourth liquid crystal domain, in which liquid crystal molecules at a center, or in the vicinity thereof, of a layer plane and a thickness direction of the liquid crystal layer have tilt directions that are respectively a predetermined first direction, a predetermined second direction, a predetermined third direction and a predetermined fourth direction in a state where a voltage is applied between the pixel electrode and the common electrode; and any two directions among the first direction, the second direction, the third direction and the fourth direction have a difference that is generally equal to an integral multiple of 90 degrees, wherein the pixel electrode has a plurality of slits formed therein, wherein the plurality of slits include a plurality of first slits formed in a region corresponding to the first liquid crystal domain and extending generally parallel to the first direction, a plurality of second slits formed in a region corresponding to the second liquid crystal domain and extending generally parallel to the second direction, a plurality of third slits formed in a region corresponding to the third liquid crystal domain and extending generally parallel to the third direction, and a plurality of fourth slits formed in a region corresponding to the fourth liquid crystal domain and extending generally parallel to the fourth direction, wherein the first substrate further includes a shield common electrode formed of a transparent conductive material, provided with a potential equal to that of the common electrode, and located between the plurality of source lines and the pixel electrode in the thickness direction of the liquid crystal layer, and wherein the shield common electrode includes a solid portion overlapping the plurality of source lines and one end portion and the other end portion among two end portions, in the row direction, of the pixel electrode as seen in a direction normal to a display plane, and also includes a first cutout portion formed across a region corresponding to the first liquid crystal domain, a region corresponding to the second liquid crystal domain, a region corresponding to the third liquid crystal domain and a region corresponding to the fourth liquid crystal domain in each of the plurality of pixels, the first cutout portion including portions overlapping the plurality of slits as seen in the direction normal to the display plane.

[Item 2]

The liquid crystal display device of item 1, wherein the shield common electrode further includes a plurality of second cutout portions each extending from the first cutout portion so as to be partially enclosed by the solid portion, the plurality of second cutout portions overlapping at least a part the plurality of slits, as seen in the direction normal to the display plane.

[Item 3]

The liquid crystal display device of item 2, wherein the plurality of second cutout portions each have a width longer than, or equal to, a width of each of the plurality of slits.

[Item 4]

The liquid crystal display device of item 1, wherein at least a part of the plurality of slits each include a main portion and a narrow portion narrower than the main portion, the narrow portion overlapping the solid portion of the shield common electrode as seen in the direction normal to the display plane.

[Item 5]

The liquid crystal display device of item 4, wherein in each of the plurality of pixels, the first liquid crystal domain, the second liquid crystal domain, the third liquid crystal domain and the fourth liquid crystal domain are located in four rows by one column.

[Item 6]

The liquid crystal display device of item 5, wherein a portion of a plurality of edges of the pixel electrode, that is close to the first liquid crystal domain includes a first edge portion, regarding which an azimuth angle direction perpendicular to the first edge portion and directed toward an internal region of the pixel electrode makes an angle exceeding 90 degrees with the first direction, wherein a portion of the plurality of edges of the pixel electrode, that is close to the second liquid crystal domain includes a second edge portion, regarding which an azimuth angle direction perpendicular to the second edge portion and directed toward the internal region of the pixel electrode makes an angle exceeding 90 degrees with the second direction, wherein a portion of the plurality of edges of the pixel electrode, that is close to the third liquid crystal domain includes a third edge portion, regarding which an azimuth angle direction perpendicular to the third edge portion and directed toward the internal region of the pixel electrode makes an angle exceeding 90 degrees with the third direction, wherein a portion of the plurality of edges of the pixel electrode, that is close to the fourth liquid crystal domain includes a fourth edge portion, regarding which an azimuth angle direction perpendicular to the fourth edge portion and directed toward the internal region of the pixel electrode makes an angle exceeding 90 degrees with the fourth direction, and wherein the first edge portion, the second edge portion, the third edge portion and the fourth edge portion are each located in the one end portion or the other end portion, in the row direction, of the pixel electrode.

[Item 7]

The liquid crystal display device of item 6, wherein the plurality of first slits include a slit including the narrow portion on the side of the first edge portion and a slit including the narrow portion on a side opposite to the first edge portion, wherein the plurality of second slits include a slit including the narrow portion on the side of the second edge portion and a slit including the narrow portion on a side opposite to the second edge portion, wherein the plurality of third slits include a slit including the narrow portion on the side of the third edge portion and a slit including the narrow portion on a side opposite to the third edge portion, and wherein the plurality of fourth slits include a slit including the narrow portion on the side of the fourth edge portion and a slit including the narrow portion on a side opposite to the fourth edge portion.

[Item 8]

The liquid crystal display device of item 6, wherein the plurality of first slits include a slit including the narrow portion on the side of the first edge portion, but does not include any slit including the narrow portion on a side opposite to the first edge portion, wherein the plurality of second slits include a slit including the narrow portion on the side of the second edge portion, but does not include any slit including the narrow portion on a side opposite to the second edge portion, wherein the plurality of third slits include a slit including the narrow portion on the side of the third edge portion, but does not include any slit including the narrow portion on a side opposite to the third edge portion, and wherein the plurality of fourth slits include a slit including the narrow portion on the side of the fourth edge portion, but does not include any slit including the narrow portion on a side opposite to the fourth edge portion.

[Item 9]

The liquid crystal display device of any one of items 1 through 4, wherein in each of the plurality of pixels, the first liquid crystal domain, the second liquid crystal domain, the third liquid crystal domain and the fourth liquid crystal domain are located in two rows by two columns.

[Item 10]

The liquid crystal display device of any one of items 1 through 9, wherein the first alignment film and the second alignment film are each a photo alignment film.

[Item 11]

The liquid crystal display device of any one of items 1 through 10, wherein in each of the first liquid crystal domain, the second liquid crystal domain, the third liquid crystal domain and the fourth liquid crystal domain, a pretilt direction defined by the first alignment film and a pretilt direction defined by the second alignment film are generally antiparallel to each other.

[Item 12]

The liquid crystal display device of any one of items 1 through 9, further comprising an alignment sustaining layer formed of a photopolymerized material on a surface, of each of the first alignment film and the second alignment film, closer to the liquid crystal layer, the alignment sustaining layer defining a pretilt direction of the liquid crystal molecules in a state where no voltage is applied to the liquid crystal layer.

According to embodiments of the present invention, the transmittance of a liquid crystal display device of the 4D-RTN mode, a liquid crystal display device of the 4D-ECB mode and a liquid crystal display device using the PSA technology may be sufficiently improved while a pixel electrode having slits formed therein and a shield common electrode are used in combination.

DETAILED DESCRIPTION

[Description of the Terms]

Figure 1:
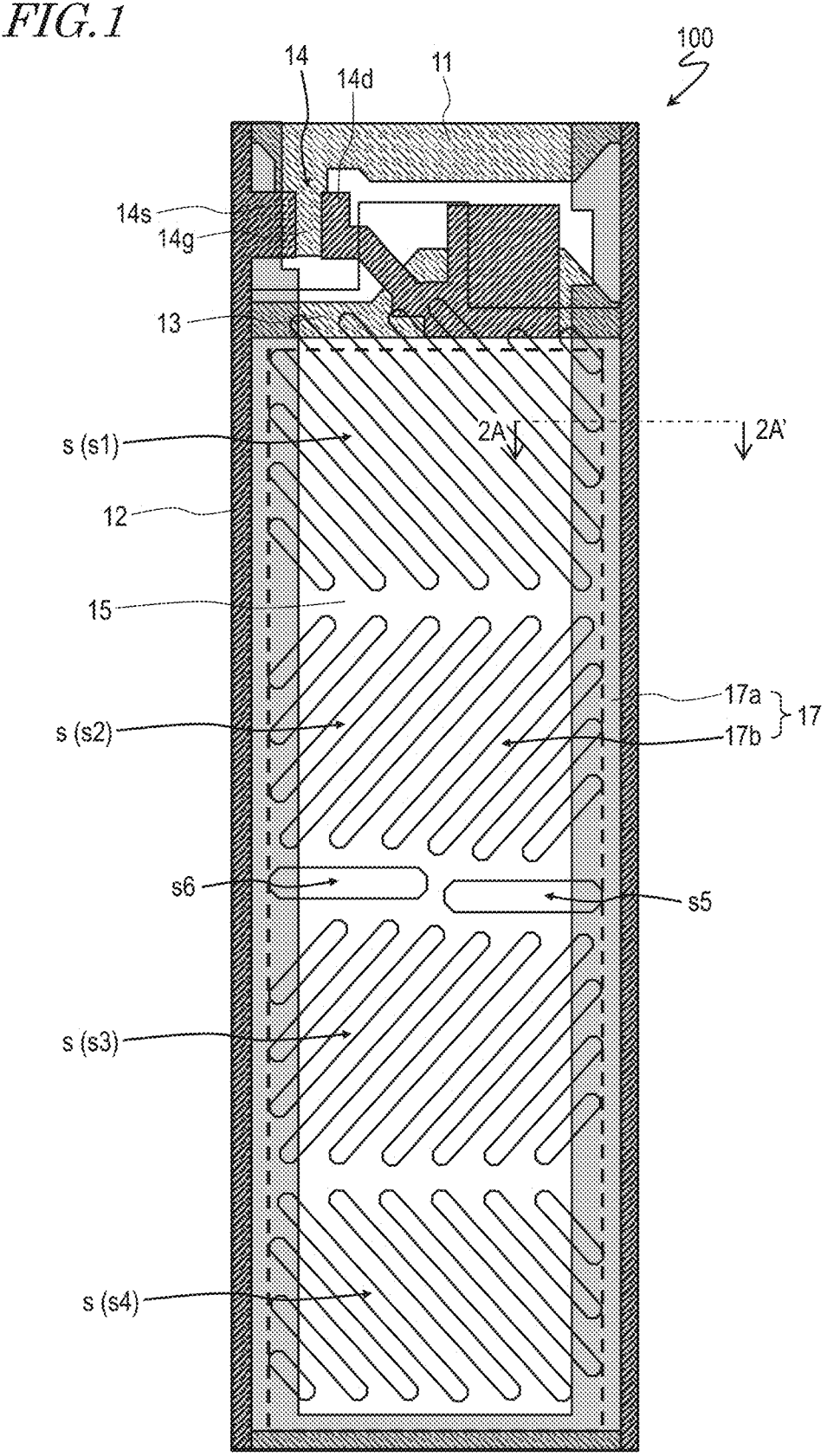
FIG. 1 is a plan view schematically showing a liquid crystal display device 100 according to an embodiment of the present invention, and shows a region corresponding to one pixel.

First, main terms used in this specification will be described.

In this specification, the "vertical alignment -type liquid crystal layer" refers to a liquid crystal layer in which the liquid crystal molecules are aligned generally vertical (at an angle of, for example, 85 degrees or higher) with respect to a surface of an alignment film (vertical alignment film). The liquid crystal molecules contained in the vertical alignment-type liquid crystal layer have negative anisotropy. A combination of a vertical alignment-type liquid crystal layer and a pair of polarizing plates located in crossed Nicols so as to face each other with the liquid crystal layer being provided therebetween (namely, located such that transmission axes of the polarizing plates are generally perpendicular to each other) provides normally black-mode display.

In this specification, the "pixel" refers to a minimum unit that represents a specific grayscale in display. In color display, the "pixel" corresponds to a unit that represents the grayscale of each of, for example, R, G and B. A combination of an R pixel, a G pixel and a B pixel forms one color display pixel. In this specification, a region, in a liquid crystal display device, that corresponds to the "pixel"in display (pixel region) is also referred to as the "pixel".

The "pretilt direction" refers to an alignment direction of liquid crystal molecules defined by an alignment film, and is an azimuth angle direction in a display plane. An angle made by the liquid crystal molecules and a surface of the alignment, film is referred to as the "pretilt angle". It is preferred that the alignment treatment on the alignment film (process of causing the alignment film to express the capability of defining a predetermined pretilt direction) is performed by a photo alignment treatment as described below.

The combination of the pretilt directions defined by a pair of alignment films facing each other with the liquid crystal layer being provided therebetween may be varied to form a 4-domain structure. A pixel (pixel region) divided into four has four liquid crystal domains.

The liquid crystal domains are each characterized by a tilt direction of the liquid crystal molecules at, and in the vicinity of, the center in the layer plane and the thickness of the liquid crystal layer when a voltage is applied to the liquid crystal layer (the tilt direction is also referred to as the "reference alignment direction"). The tilt direction (reference alignment direction) has a dominant influence on the viewing angle dependence of each domain. Now, it is assumed that a tilted liquid crystal molecule has a vector directed from an end closer to a rear substrate toward an end farther from the rear substrate (namely, toward the end closer to a front substrate) (in FIG. 4C referred to below, the vector directed from a tip end toward a head of each pin). The tilt direction is an orientation represented by a component, in the plane of the substrate, of this vector (shadow of the vector projected onto the plane of the substrate), and is an azimuth angle direction. The azimuth angle direction is defined based on a horizontal direction on the display plane, and the counterclockwise direction is a positive direction (where the display plane is a face of a clock, the 3 o'clock direction has an azimuth angle of 0 degrees, and the counterclockwise direction is a positive direction). The four liquid crystal domains are set such that the tilt directions thereof are four directions, any two of which make an angle that is generally equal to an integral multiple of 90 degrees (such that the four directions are, for example, the directions of 10:30, 07:30, 04:30 and 01:30). With such settings, the viewing angle characteristics are averaged, and good display may be provided. From the point of view of the uniformity of the viewing angle characteristics, it is preferred that the four liquid crystal domains have a generally equal area size in the pixel region to each other.

A vertical alignment-type liquid crystal layer described as an example in each of the following embodiments contains liquid crystal molecules having negative dielectric anisotropy (liquid crystal molecules of a nematic liquid crystal material having negative dielectric anisotropy). In a liquid crystal display device of the 4D-ECB mode described as an example in the following embodiments, the pretilt direction defined by one of a pair of alignment films and the pretilt direction defined by the other of the pair of alignment films are generally antiparallel to each other. The tilt direction (reference alignment direction) is defined at an azimuth angle direction generally matching the pretilt direction, among these two pretilt directions, defined by a rear alignment film. When a voltage is applied to the liquid crystal layer, the liquid crystal molecules do not exhibit the twist alignment. It is preferred that the pretilt angles respectively defined by the pair of alignment films are generally equal to each other.

In a liquid crystal display device of the 4D-RTN mode described as an example in the following embodiments, the pretilt direction defined by one of a pair of alignment films and the pretilt direction defined by the other of the pair of alignment films are generally perpendicular to each other (namely, are different from each other by about 90 degrees). The tilt direction (reference alignment direction) of each of liquid crystal domains is defined by these two pretilt directions. When a voltage is applied to the liquid crystal layer, the liquid crystal molecules exhibit a twist alignment. The liquid crystal layer does not need to be provided with a chiral agent. Alternatively, the liquid crystal layer may be provided with a chiral agent when necessary.

As an alignment treatment on the alignment film, a photo alignment treatment is preferred from the point of view of mass-productivity. The photo alignment treatment may be performed in a contactless manner. Therefore, electrostatic charges, which would be otherwise generated by friction by a rubbing treatment, are not generated. Thus, a decrease in the yield may be prevented. In addition, use of a photo alignment film containing a photosensitive group may suppress dispersion in the pretilt angle.

In the following embodiments, a liquid crystal display device using the PSA technology is described in addition to a liquid crystal display device of the 4D-ECB mode and a liquid crystal display device of the 4D-RTN mode. In the liquid crystal display device using the PSA technology, the "pretilt direction" is defined by an alignment sustaining layer.

Hereinafter, embodiments of the present invention will be described with reference to the drawings. The present invention is not limited by any of the following embodiments.

(Embodiment 1)

Figure 2:
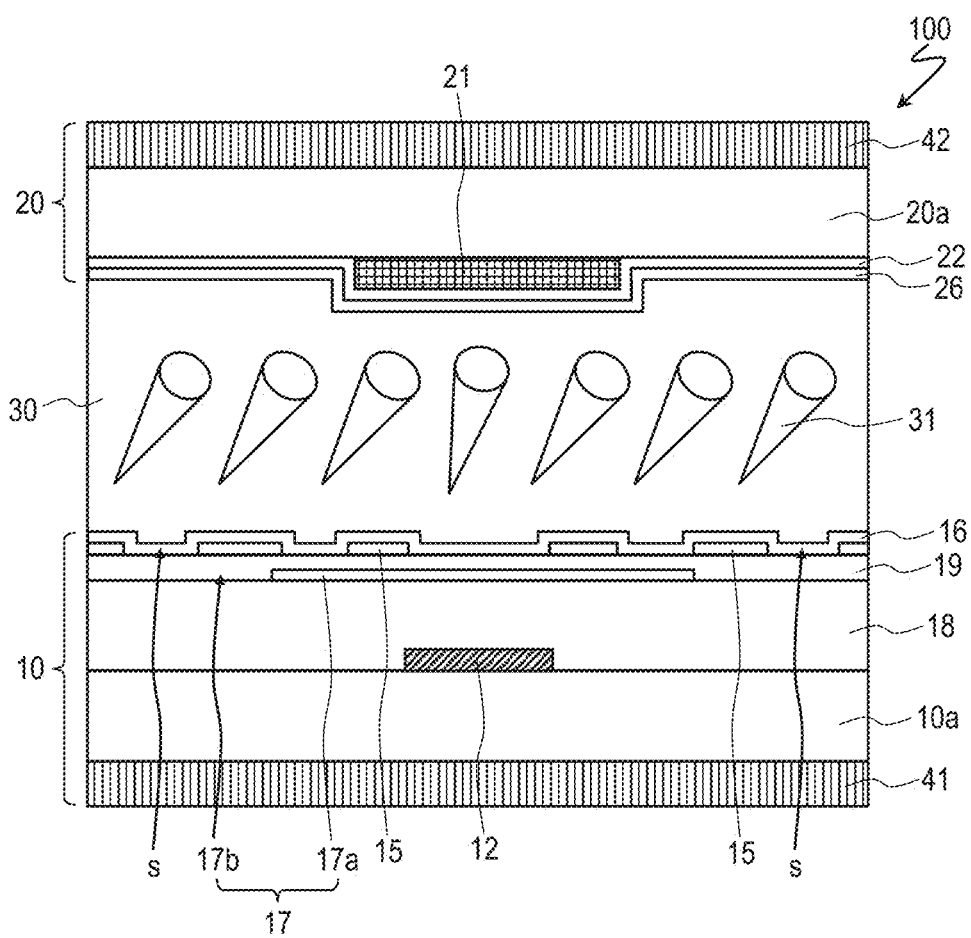
FIG. 2 is a cross-sectional view schematically showing the Liquid crystal display device 100, and shows a cross-section taken along line 2A-2A' in FIG. 1.

With reference to FIG. 1 and FIG. 2, a liquid crystal display device 100 according to this embodiment will be described. The liquid crystal display device 100 according to this embodiment is of the 4D-ECB mode. FIG. 1 and FIG. 2 are respectively a plan view and a cross-sectional view schematically showing the liquid crystal display device 100. FIG. 2 shows a cross-section taken along line 2A-2A' in FIG. 1.

The liquid crystal display device 100 includes an active matrix substrate 10 and a counter substrate 20 facing each other, and a vertical alignment-type liquid crystal layer 30 provided between the active matrix substrate 10 and the counter substrate 20. The liquid crystal display device 100 includes a plurality of pixels. The plurality of pixels are arrayed in a matrix including a plurality of rows and a plurality of columns. Although not shown here, a backlight unit (illumination device) is located on a rear surface of the active matrix substrate 10 (the side opposite to a viewer).

The active matrix substrate 10 includes a plurality of gate lines 11 extending in a row direction, a plurality of source lines 12 extending in a column direction, and a plurality of storage capacitor lines 13 extending in the row direction. The active matrix substrate 10 further includes a thin film transistor (TFT) 14 provided in each of the pixels, a pixel electrode 15 provided in each of the pixels, and a first alignment film 16 provided between the pixel electrode 15 and the liquid crystal layer 30. The active matrix substrate 10 further includes a shield common electrode 17 described below.

The above-described gate lines 11 and the like are supported by a substrate 10a. The substrate 10a is transparent and insulating. The substrate 10a is, for example, a glass substrate or a plastic substrate.

The TFT 14 includes a gate electrode 14g, a gate insulating layer (not shown), a semiconductor layer (not shown), a source electrode 14s, and a drain electrode 14d. The gate electrode 14g is electrically connected with one of the gate lines 11 corresponding thereto. In the example shown here, the gate electrode 14g extends in the column direction from the gate line 11. The source electrode 11s is electrically connected with one of the source lines 12 corresponding thereto. In the example shown here, the source electrode 12s extends in the row direction from the source line 12. The drain electrode 14d is electrically connected with the pixel electrode 15. The semiconductor layer may be an amorphous silicon layer, a polycrystalline silicon layer, or an oxide semiconductor layer such as an In—Ga—Zn—O-based semiconductor layer or the like.

The pixel electrode 15 is formed of a transparent conductive material (e.g., ITO). The pixel electrode 15 has a plurality of slits s formed therein. The plurality of slits s will be described in detail below.

The counter substrate 20 includes a black matrix (light-blocking layer) 21, a common electrode 22 facing the pixel electrode 15, and a second alignment film 26 provided between the common electrode 22 and the liquid crystal layer 30.

The above-described black matrix 21 and the like are supported by a substrate 20a. The substrate 20a is transparent and insulating. The substrate 20a is, for example, a glass substrate or a plastic substrate.

The black matrix 21 has an opening formed therein, defining each of the pixels, formed therein. In FIG. 1, the opening of the black matrix 21 is represented by the dashed line. The common electrode 22 is formed of a transparent conductive material (e.g., ITO). The common electrode 22 is a continuous conductive film formed over the entirety of a display region, and is provided with a common potential for all the pixels.

Although not shown here, the counter substrate 20 may further include a color filter layer. The color filter layer typically includes a red color filter, a green color filter and a blue color filter.

The shield common electrode 17 is formed of a transparent conductive material (e.g., ITO), and is provided with a potential equal to that of the common electrode 22. In the example shown here, an organic insulating layer 18 is formed so as to cover the TFT 14 and the source line 12, and the shield common electrode 17 is provided on the organic insulating layer 18. An inorganic insulating layer 19 is formed so as to cover the shield common electrode 17, and the pixel electrode 15 is provided on the inorganic insulating layer 19. In this embodiment, a case where the inorganic insulating layer 19 is used is described. Alternatively, an organic insulating layer may be formed so as to cover the shield common electrode 17. As described above, the shield common electrode 17 is located between the source line 12 and the pixel electrode 15 in a thickness direction of the liquid crystal layer 30.

The shield common electrode 17 includes a portion where a conductive film is present (hereinafter, referred to as a "solid portion") 17a and a first cutout portion 17b where the conductive film is absent. As seen in a direction normal to a display plane, the solid portion 17a of the shield common electrode 17 overlaps the plurality of source lines 12, and also overlaps one end portion and the other end portion (in this embodiment, a right end portion and a left end portion) of two end portions, in the row direction, of the pixel electrode 15. The first cutout portion 17b will be described in detail below.

The color filter layer may be omitted from the counter substrate 20, and a color filter layer may be provided instead of the organic insulating layer 18 (color filter-on-array structure).

The first alignment film 16 and the second alignment film 26 have an alignment regulation force of aligning the liquid crystal molecules 31 generally vertical to surfaces thereof. In this embodiment, the first alignment film 16 and the second alignment film 26 have been subjected to a photo alignment treatment. Namely, the first alignment film 16 and the second alignment film 26 are each a photo alignment film.

The liquid crystal display device 100 further includes a pair of polarizing plates 41 and 42 facing each other with the liquid crystal layer 30 being provided therebetween. In the example shown in FIG. 2, one of the pair of polarizing plates 41 and 42, more specifically, the polarizing plate 41, is located on a rear surface of the substrate 10a, and the other polarizing plate 42 is located on a surface, of the substrate 20a, that is closer to the viewer. The pair of polarizing plates 41 and 42 are located such that transmission axes thereof are generally perpendicular to each other (namely, in crossed Nicols).

Figure 3:
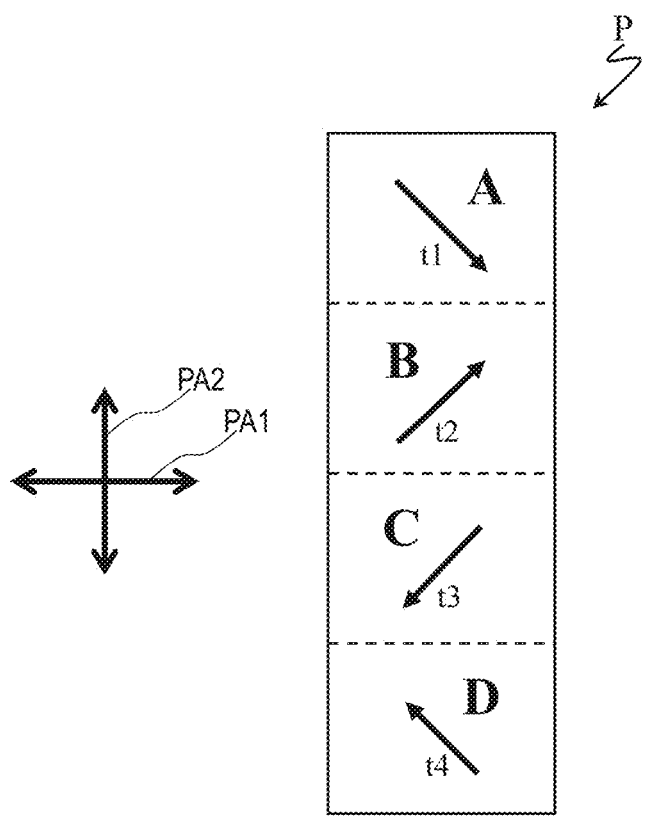
FIG. 3 shows an alignment division structure of a pixel P in the liquid crystal display device 100.

FIG. 3 shows an alignment division structure of one pixel P in the liquid crystal display device 100.

When a voltage is applied between the pixel electrode 15 and the counter electrode 22, four liquid crystal domains A, B, C and D are formed in the liquid crystal layer 30 in each pixel P as shown in FIG. 3. Four directors t1, t2, t3 and t4 representing alignment directions of the liquid crystal molecules contained in the liquid crystal domains A, B, C and D (a "director" is a reference alignment direction defined by the first alignment film 16 and the second alignment film 26) are of different azimuths from each other.

Where the azimuth angle of a horizontal direction (3 o'clock direction) on the display plane is 0 degrees, the azimuth of the director t1 in the liquid crystal domain A is a direction of about 315 degrees, the azimuth of the director t2 in the liquid crystal domain B is a direction of about 45 degrees, the azimuth of the director t3 in the liquid crystal domain C is a direction of about 225 degrees, and the azimuth of the director t4 in the liquid crystal domain D is a direction of about 135 degrees. Namely, any two azimuths among the four azimuths of the four directors t1, t2, t3 and t4 in the liquid crystal domains A, B, C and D have a difference that is generally equal to an integral multiple of 90 degrees. In this specification, the "direction of about 45 degrees", the "direction of about 135 degrees", the "direction of about 225 degrees", and the "direction of about 315 degrees" respectively refer to a "direction of 40 to 50 degrees", a "direction of 130 to 140 degrees", a "direction of 220 to 230 degrees", and a "direction of 310 to 320 degrees".

In the example shown in FIG. 3, the four liquid crystal domains A, B, C and D are located in four rows by one column in each pixel P. More specifically, the liquid crystal domains A, B, C and D are located in this order from top to bottom in each pixel P. The azimuths of the directors in any two adjacent liquid crystal domains among the liquid crystal domains A, B, C and D are different from each other by about 90 degrees or about 180 degrees. More specifically, the azimuths of the directors in the liquid crystal domains A and B are different from each other by about 90 degrees. The azimuths of the directors in the liquid crystal domains B and C are different from each other by about 180 degrees. The azimuths of the directors in the liquid crystal domains C and D are different from each other by about 90 degrees.

The pair of polarizing plates 41 and 42 respectively have transmission axes (polarization axes) PA1 and PA2. One of the transmission axes PA1 and PA2 is parallel to the horizontal direction on the display plane, and the other of the transmission axes PA1 and PA2 is parallel to a vertical direction on the display plane. Therefore, the transmission axes PA1 and PA2 of the polarizing plates 41 and 42 each make an angle of about 45 degrees with respect to each of the azimuths of the directors t1, t2, t3 and t4 of the liquid crystal domains A, B, D and D.

FIG. 3 shows a case where the four liquid crystal domains A, B, D and D have an equal area size to each other in the pixel P. Alternatively, the four liquid crystal domains A, B, D and D do not need to have an equal area size to each other. It should be noted that from the point of view of uniformity of the viewing angle characteristics, it is preferred that the difference in the area size among the four liquid crystal domains A, B, D and D is as small as possible. FIG. 3 shows an example of 4-domain structure that is most preferred (namely, ideal) for the viewing angle characteristics.

Figure 4A:
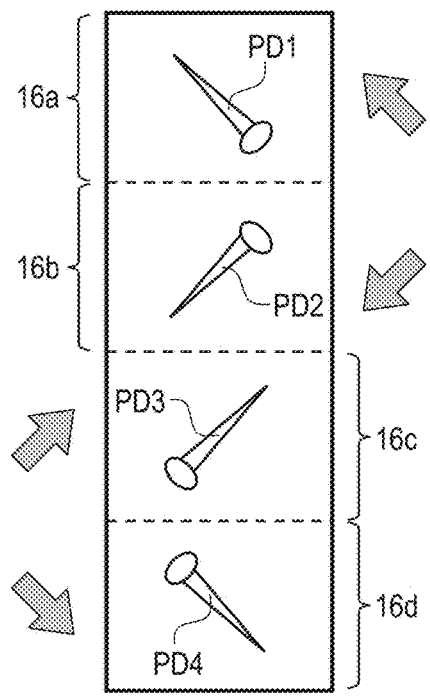
FIG. 4A is provided to illustrate a method for providing the alignment division structure of the pixel P, and shows pretilt directions PD1, PD2, PD3 and PD4 defined by a first alignment film 16 of an active matrix substrate 10.
Figure 4B:
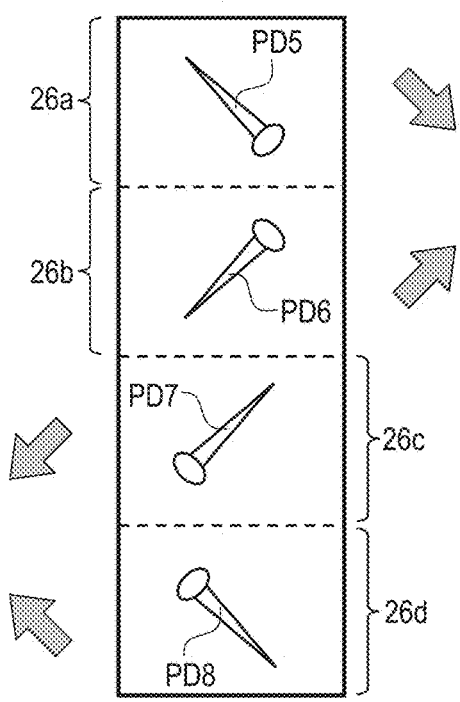
FIG. 4B is provided to illustrate the method for providing the alignment division structure of the pixel P, and shows pretilt directions PD5, PD6, PD7 and PD8 defined by a second alignment film 26 of a counter substrate 20.
Figure 4C:
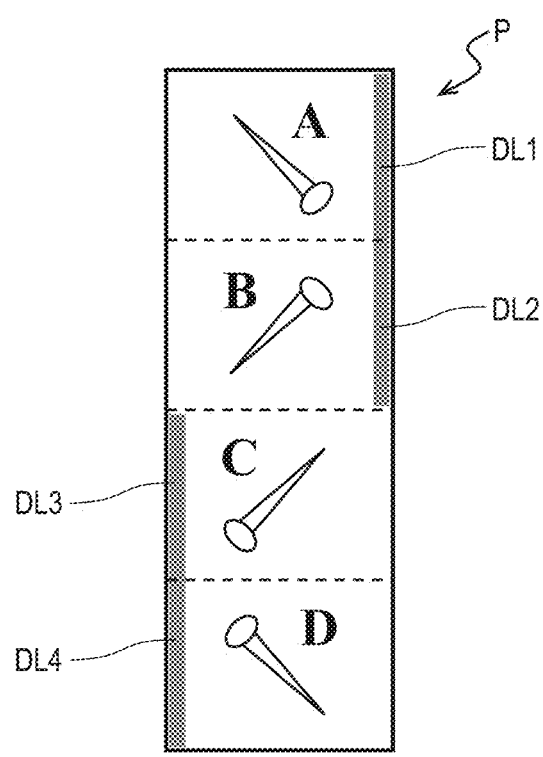
FIG. 4C is provided to illustrate the method for providing the alignment division structure of the pixel P, and shows tilt directions (directors) when a voltage is applied to a liquid crystal layer 30 after the active matrix substrate 10 and the counter substrate 20 are assembled together.

Now, with reference to FIG. 4A, FIG. 4B and FIG. 4C, an alignment division method for providing the alignment division structure of the pixel P will be described. FIG. 4A shows pretilt directions PD1, PD2, PD3 and PD4 defined by the first alignment film 16 provided in the active matrix substrate 10. FIG. 4B shows pretilt directions PD5, PD6, PD7 and PD8 defined by the second alignment film 26 provided in the counter substrate 20. FIG. 4C shows tilt directions (directors) provided when a voltage is applied to the liquid crystal layer 30 after the active matrix substrate 10 and the counter substrate 20 are assembled together.

As shown in FIG. 4A, the first, alignment film 16 includes, in each pixel P, a first pretilt region 16a, a second pretilt region 16b, a third preti.lt region 16c and a fourth pretilt region 16d, which respectively define the first pretilt direction PD1, the second pretilt direction PD2, the third pretilt direction PD3 and the fourth pretilt direction PD4 different from each other. Specifically, a region, of the first alignment film 16, corresponding to one pixel P is divided info four regions in an up-down direction, and the four regions (the first pretilt region, the second pretilt region, the third pretilt region and the fourth pretilt region) 16a, 16b, 16c and 16d have been subjected to a photo alignment treatment so as to respectively define the pretilt directions different from each other (the first pretilt direction, the second pretilt direction, the third pretilt direction and the fourth pretilt direction) PD1, PD2, PD3 and PD4. In this embodiment, the photo alignment treatment is performed by oblique irradiation with ultraviolet rays (e.g., linearly polarized ultraviolet rays) in directions represented by the arrows.

As shown in FIG. 4B, the second alignment film 26 includes, in each pixel P, a fifth pretilt region 26a, a sixth pretilt region 26b, a seventh pretilt region 26c and an eighth pretilt region 26d, which respectively define the fifth pretilt direction PD5, the sixth pretilt direction PD6, the seventh pretilt direction PD7 and the eighth pretilt direction PD8 different from each other. Specifically, a region, of the second alignment film 26, corresponding to one pixel P is divided into four regions in the up-down direction, and the four regions (the fifth pretilt region, the sixth pretilt region, the seventh pretilt region and the eighth pretilt region) 26a, 26b, 26c and 26d have been subjected to a photo alignment treatment so as to respectively define the pretilt directions different from each other (the fifth pretilt direction, the sixth pretilt direction, the seventh pretilt direction and the eighth pretilt direction) PD5, PD6, PD7 and PD8. In this embodiment, the photo alignment treatment is performed by oblique irradiation with ultraviolet rays (e.g., linearly polarized ultraviolet rays) in directions represented by the arrows.

The active matrix substrate 10 and the counter substrate 20 subjected to the photo alignment treatment as shown in FIG. 4A and FIG. 4B are assembled together, and as a result, the pixel P having the alignment division structure as shown in FIG. 4C may be formed. In each of the liquid crystal domains A through D, the pretilt direction defined by the first alignment film 16 included in the active matrix substrate 10 and the pretilt direction defined by the second alignment film 26 included in the counter matrix substrate 20 are generally antiparallel to each other. Therefore, in each of the liquid crystal domains A through D, the twist angle of the liquid crystal molecules is substantially 0 degrees.

In the pixel P having the alignment division structure, dark lines DL1, DL2, DL3 and DL4 are generated in the vicinity of edges of the pixel P. Now, a reason why the dark lines DL1 through DL4 are generated will be described.

In the case where an edge of the pixel electrode 15 that is close to a liquid crystal domain includes a portion at which an azimuth angle direction perpendicular to the edge and directed toward an internal region of the pixel electrode 15 makes an angle exceeding 90 degrees with the tilt direction of the liquid crystal domain (reference alignment direction) (hereinafter, such a portion will be referred to as an "edge portion"), a dark line parallel to the edge portion is formed inside the edge portion.

Figure 5:
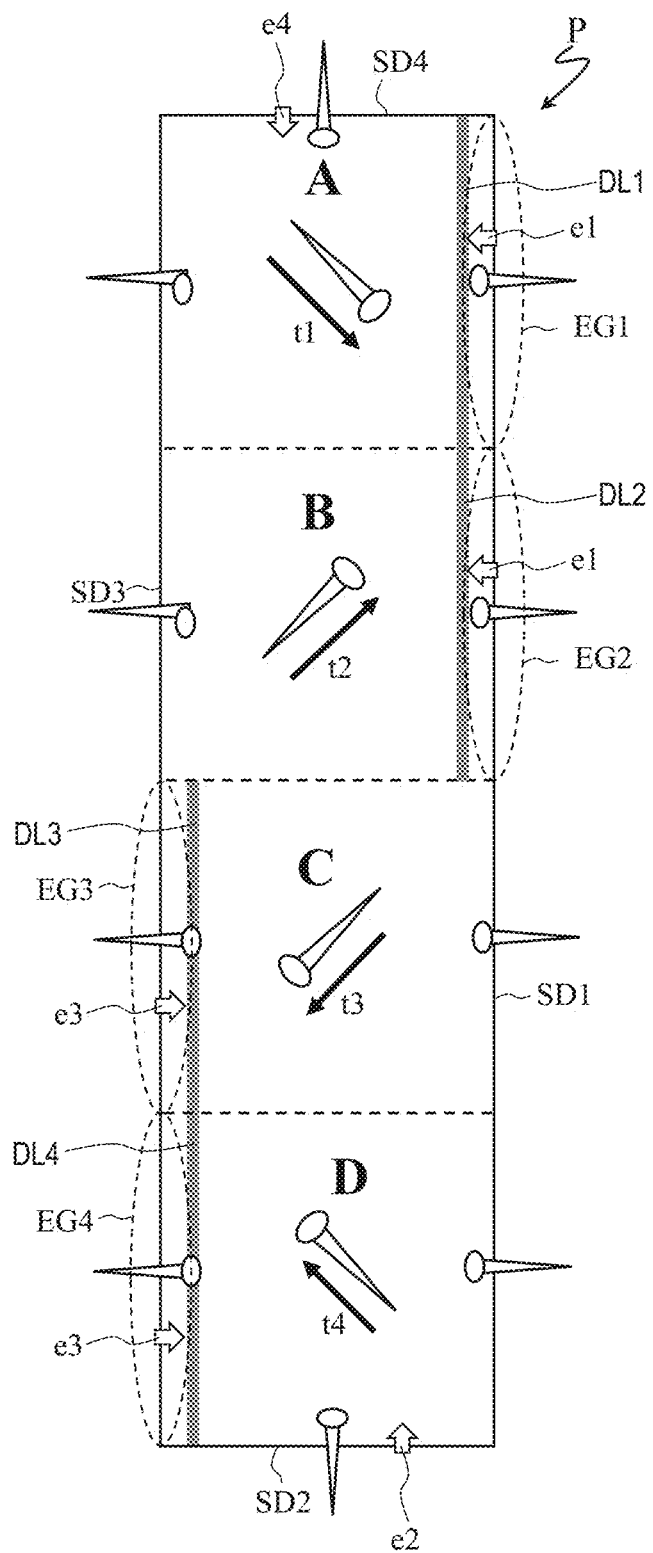
FIG. 5 is provided to illustrate a reason why dark lines DL1 through DL4 are generated.

As shown in FIG. 5, the pixel electrode 15 has four edges (sides) SD1, SD2, SD3 and SD4, and an oblique electric field generated at each of the edges SD1, SD2, SD3 and SD4 at the time of voltage application exhibits an alignment regulation force having a component of a direction (azimuth angle direction) that is perpendicular to the corresponding edge and is directed toward the internal region of the pixel electrode 15. In FIG. 5, the azimuth angle directions respectively perpenditular to the four edges SD1, SD2, SD3 and SD4 and directed toward the internal region of the pixel electrode 15 are represented with arrows e1, e2, e3 and e4.

Each of the four liquid crystal domains A, B, C and D is close to two or three among the four edges SD1, SD2, SD3 and SD4 of the pixel electrode 15, and receives an alignment regulation force by the oblique electric field generated at each of the corresponding edges at the time of voltage application.

At a first edge portion EG1 (a part of the right edge SD1) of the edges of the pixel electrode 15 that are close to the liquid crystal domain A, the azimuth angle direction e1, which is perpendicular to the first edge portion EG1 and is directed toward the internal region of the pixel electrode 15, makes an angle exceeding 90 degrees (specifically, about 135 degrees) with the tilt direction t1 of the liquid crystal domain A. As a result, in the liquid crystal domain A, a dark line DL1 parallel to the first edge portion EG1 is generated at the time of voltage application.

Similarly, at a second edge portion EG2 (another part of the right edge SD1) of the edges of the pixel electrode 15 that are close to the liquid crystal domain B, the azimuth angle direction e1, which is perpendicular to the second edge portion EG2 and is directed toward the internal region of the pixel electrode 15, makes an angle exceeding 90 degrees (specifically, about 135 degrees) with the tilt direction t2 of the liquid crystal domain B. As a result, in the liquid crystal domain B, a dark line DL2 parallel to the second edge portion EG2 is generated at the time of voltage application.

Similarly, at a third edge portion EG3 (a part of the left edge SD3) of the edges of the pixel electrode 15 that are close to the liquid crystal domain C, the azimuth angle direction e3, which is perpendicular to the third edge portion EG3 and is directed toward the internal region of the pixel electrode 15, makes an angle exceeding 90 degrees (specifically, about 135 degrees) with the tilt direction t3 of the liquid crystal domain C. As a result, in the liquid crystal domain C, a dark line DL3 parallel to the third edge portion EG3 is generated at the time of voltage application.

Similarly, at a fourth edge portion EG4 (another part of the left edge SD3) of the edges of the pixel electrode 15 that are close to the liquid crystal domain D, the azimuth angle direction e3, which is perpendicular to the fourth edge portion EG4 and is directed toward the internal region of the pixel electrode 15, makes an angle exceeding 90 degrees (specifically, about 135 degrees) with the tilt direction t4 of the liquid crystal domain D. As a result, in the liquid crystal domain D, a dark line DL4 parallel to the fourth edge portion EG4 is generated at the time of voltage application.

In the example shown in FIG. 5, the first edge portion EG1 and the second edge portion EG2 are located at one of two end portions in the row direction (at the right end portion) of the pixel electrode 15. The third edge portion EG3 and the fourth edge portion EG4 are located at the other end portion in the row direction (at the left end portion) of the pixel electrode 15.

In the pixel P, a dark line may be generated also at a border between two adjacent liquid crystal domains, but such a dark line will not be shown or described here.

As described above, the pixel electrode 15 has the plurality of slits s formed therein. As shown in FIG. 1, the plurality of slits s of the pixel electrode 15 include a plurality of first slits s1, a plurality of second slits s2, a plurality of third slits s3, and a plurality of fourth slits s4.

The plurality of first slits s1 are formed in a region corresponding to the liquid crystal domain A, and extend generally parallel to the director t1 ot the liquid crystal domain A. The plurality of second slits s2 are formed in a region corresponding to the liquid crystal domain B, and extend generally parallel to the director t2 of the liquid crystal domain B. The plurality of third slits s3 are formed in a region corresponding to the liquid crystal domain C, and extend generally parallel to the director t3 of the liquid crystal domain C. The plurality of fourth slits s4 are formed in a region corresponding to the liquid crystal domain D, and extend generally parallel, to the director t4 of the liquid crystal. domain D.

Regarding each of the liquid crystal domains A through D, a side on which the dark line is generated will be referred to as a "top side", and the side opposite thereto will be referred to as a "bottom side".

As described above, the shield common electrode 17 includes the first cutout portion 17b. In each of the pixels, the first cutout portion 17b is formed across a region corresponding to the liquid crystal domain A, a region corresponding to the liquid crystal domain B, a region corresponding to the liquid crystal domain C, and a region corresponding to the liquid crystal domain D. The first cutout portion 17b includes portions overlapping the plurality of slits s as seen in the direction normal to the display plane. In the example shown in FIG. 1, the first cutout portion 17b is rectangular.

As described above, in the liquid crystal display device 100 according to this embodiment, the active matrix substrate 10 includes the shield common electrode 17. With such a structure, a parasitic capacitance between the source line 12 and the pixel electrode 15 may be decreased to improve the numerical aperture. In addition, the shield common electrode 17 includes the first cutout portion 17b including the portions overlapping the plurality of slits s as seen in the direction normal to the display plane. With such a structure, the transmittance may be improved.

Figure 6:
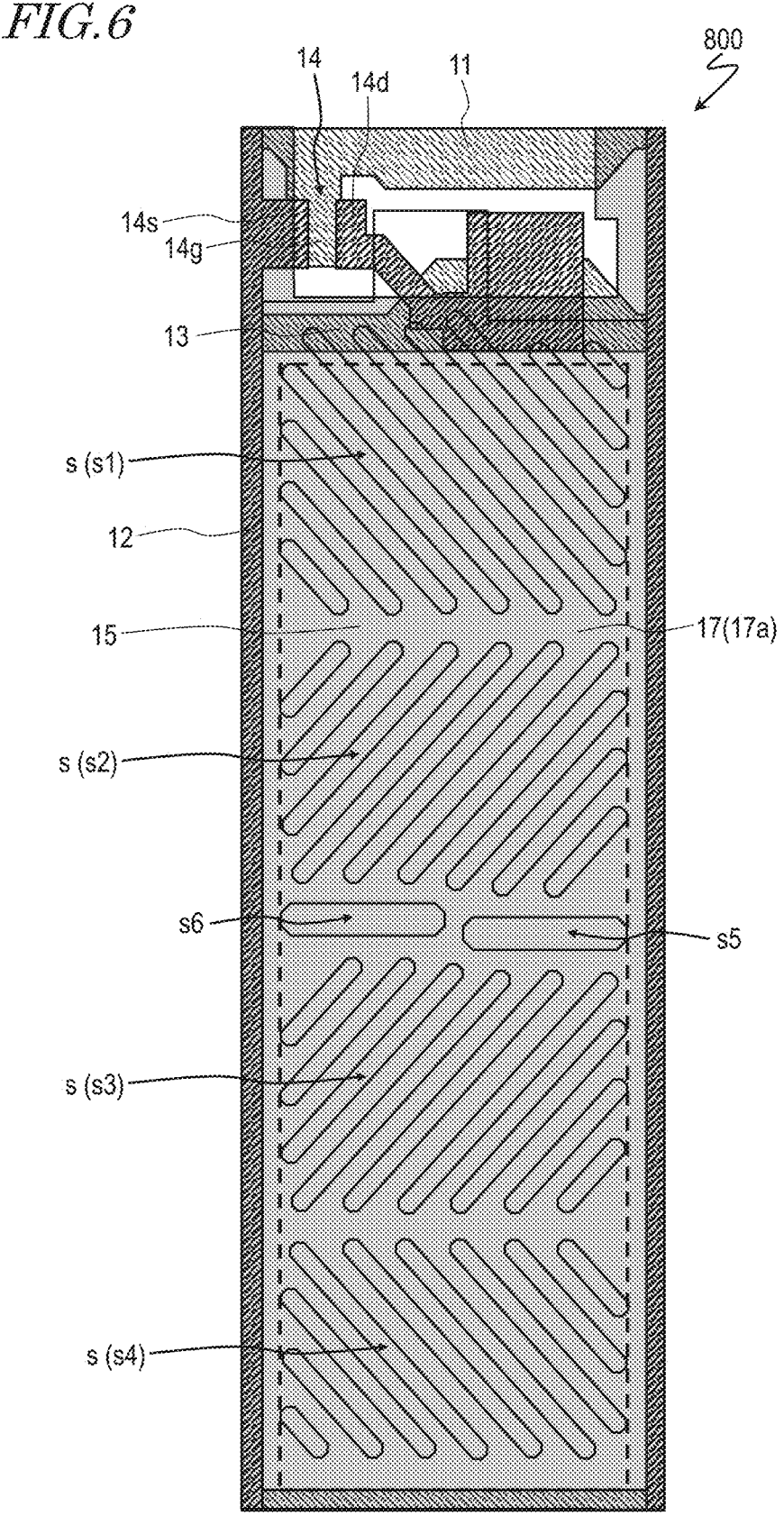
FIG. 6 is a plan view schematically showing a liquid crystal display device 800 in a comparative example.

Now, a structure in which the first cutout portion 17b of the shield common electrode 17 is generally rectangular and has a width (length in the row direction) of 40 μm is provided as example 1. Regarding example 1, the effect of Improving the transmittance was examined, and the results thereof will be described. For the examination, example 1 and a liquid crystal display device 800 in a comparative example shown in FIG. 6 were compared with each other.

In the liquid crystal display device 800 in the comparative example, the shield common electrode 17 does not include a cutout portion including portions overlapping the plurality of slits s of the pixel electrode 15, unlike in the liquid crystal display device in example 1. Namely, in the liquid crystal display device 800 in the comparative example, the solid portion 17a occupies the entirety of a region of the shield common electrode 17 corresponding to the liquid crystal domain A, the entirety of a region of the shield common electrode 17 corresponding to the liquid crystal domain B, the entirety of a region of the shield common electrode 17 corresponding to the liquid crystal domain C, and the entirety of a region of the shield common electrode 17 corresponding to the liquid crystal domain D.

Figure 7:
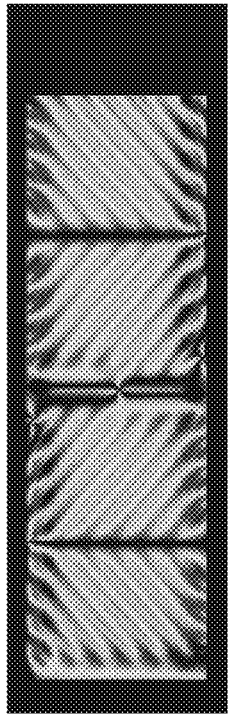
FIG. 7 shows a transmittance distribution, found by a simulation, in a pixel in example 1 during white display.
Figure 8:
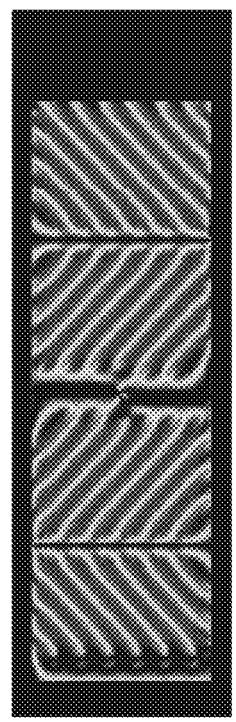
FIG. 8 shows a transmittance distribution, found by a simulation, in a pixel in the comparative example during white display.

Table 1 shows the transmittance in each of example 1 and the comparative example found by a simulation. FIG. 7 shows a transmittance distribution in a pixel in example 1 during white display (i.e., when the highest grayscale is displayed). FIG. 8 shows a transmittance distribution in a pixel in the comparative example during white display.

TABLE 1

|  | EXAMPLE 1 | COMPARATIVE EXAMPLE |
|---|---|---|
| BOTTOM SIDE | 61.5% | 44.4% |
| TOP SIDE | 59.0% | 43.4% |
| AVERAGE | 60.2% | 43.9% |

It is seen from Table 1 that the transmittance is higher in example 1 than in the comparative example. From a comparison between FIG. 7 and FIG. 8 also, it is seen that the transmittance is higher in example 1 than in the comparative example. In the comparative example, the shield common electrode 17 and the common electrode 22 have an equal potential to each other. With such a structure, the liquid crystal molecules do not easily fall, and therefore, the transmittance is significantly decreased. By contrast, the first cutout portion 17b included in the shield common electrode 17 as described above may improve the transmittance.

In the example shown in FIG. 1, the pixel electrode 15 has a fifth slit s5 and a sixth slit s6 formed therein at a border between the region corresponding to the liquid crystal domain B and the region corresponding to the liquid crystal domain C.

The fifth slit s5 and the sixth slit s6 extend in the row direction (i.e., in the shorter direction of the pixel). The fifth slit s5 extends from the vicinity of one of the two end portions (right end portion) to the vicinity of the center, in the row direction of the pixel electrode 15. The sixth slit s6 extends from the vicinity of the other end portion (left end portion) to the vicinity of the center, in the row direction of the pixel electrode 15.

The fifth slit s5 and the sixth slit s6 formed as described above may decrease the area size of double dark lines generated at the border between the liquid crystal domain B and the liquid crystal domain C. In addition, as shown in FIG. 1, the fifth slit s5 and the sixth slit s6 are positionally shifted from each other slightly in the column direction. This may improve the effect of decreasing the area size of the double dark lines.

The fifth slit s5 and the sixth slit s6 may be omitted.

(Embodiment 2)

Figure 9:
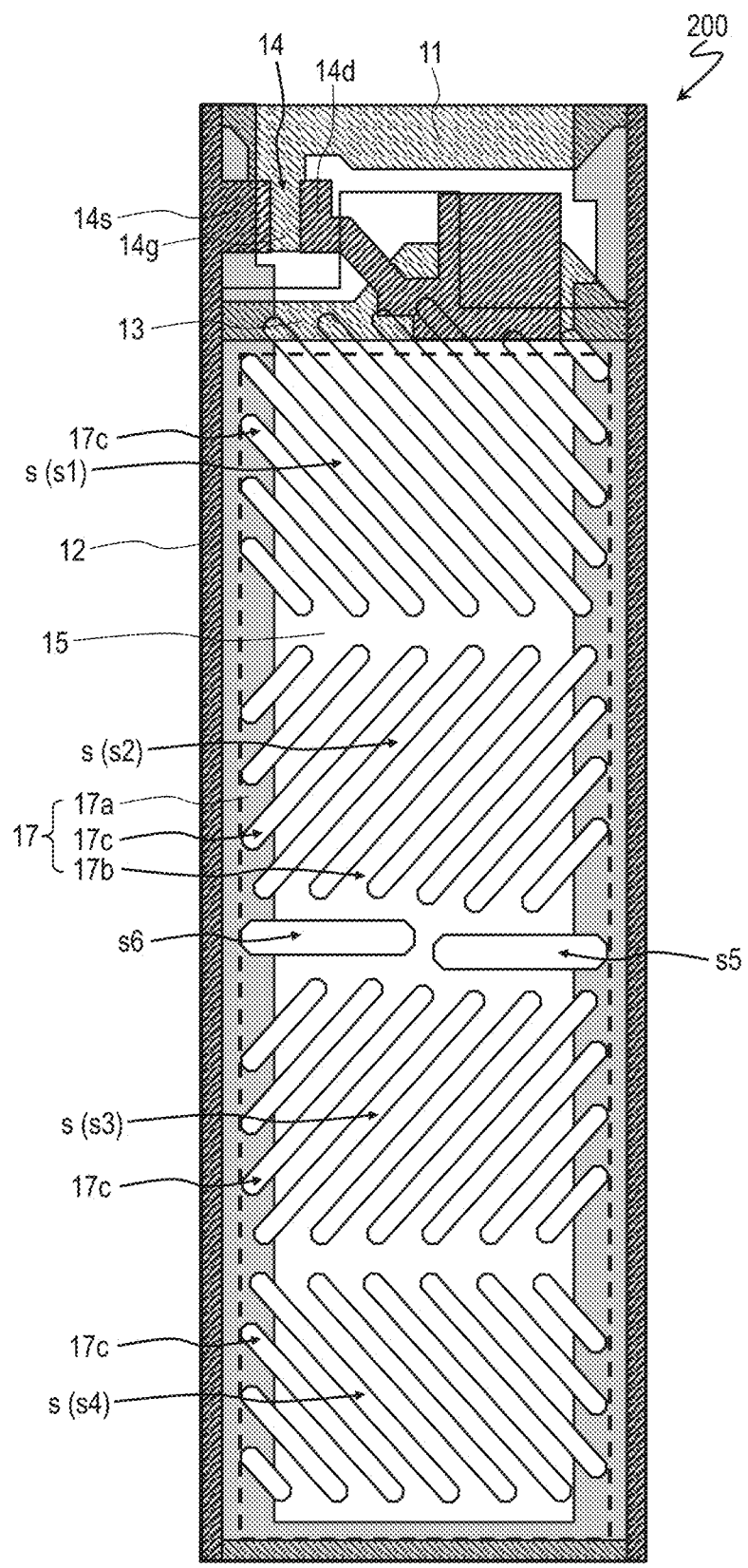
FIG. 9 is a plan view schematically showing a liquid crystal display device 200 according to another embodiment of the present invention.

With reference to FIG. 9, a liquid crystal display device 200 according to this embodiment will be described. The liquid crystal display device 200 according to this embodiment is of the 4D-ECB mode. FIG. 9 is a plan view schematically showing the liquid crystal display device 200.

The pixels in the liquid crystal display device 200 according to this embodiment each have the same alignment division structure as that of the pixel P in the liquid crystal display device 100 according to embodiment 1 (see FIG. 3). shown in FIG. 9, the shield common electrode 17 in the liquid crystal display device 200 according to this embodiment includes a first cutout portion 17b, like the shield common electrode 17 in the liquid crystal display device 100 according to embodiment 1.

The shield common electrode 17 in the liquid crystal display device 200 according to this embodiment further includes a plurality of second cutout portions 17c. The plurality of second cutout portions 17c each extend from the first cutout portions 17b so as to be partially enclosed by the solid portion 17a, and are each smaller than the first cutout portion 17b. The plurality of second cutout portions 17c overlap at least a part of the plurality of slits s of the pixel electrode 15 as seen in the direction normal to the display plane. The above-described second cutout portions 17c included in the shield common electrode 17 may further improve the transmittance.

Now, structures in which the silts s of the pixel electrode 15 each have a width of 3.0 μm and the second cutout portions 17c of the shield common electrode 17 each have a width of 2.0 μm, 2.5 μm, 3.0 μm, 3.5 μm and 4.0 μm are provided as examples 2A, 2B, 2C, 2D and 2E. Regarding examples 2A through 2E, the effect of improving the transmittance was examined, and the results thereof will be described.

Figure 10:
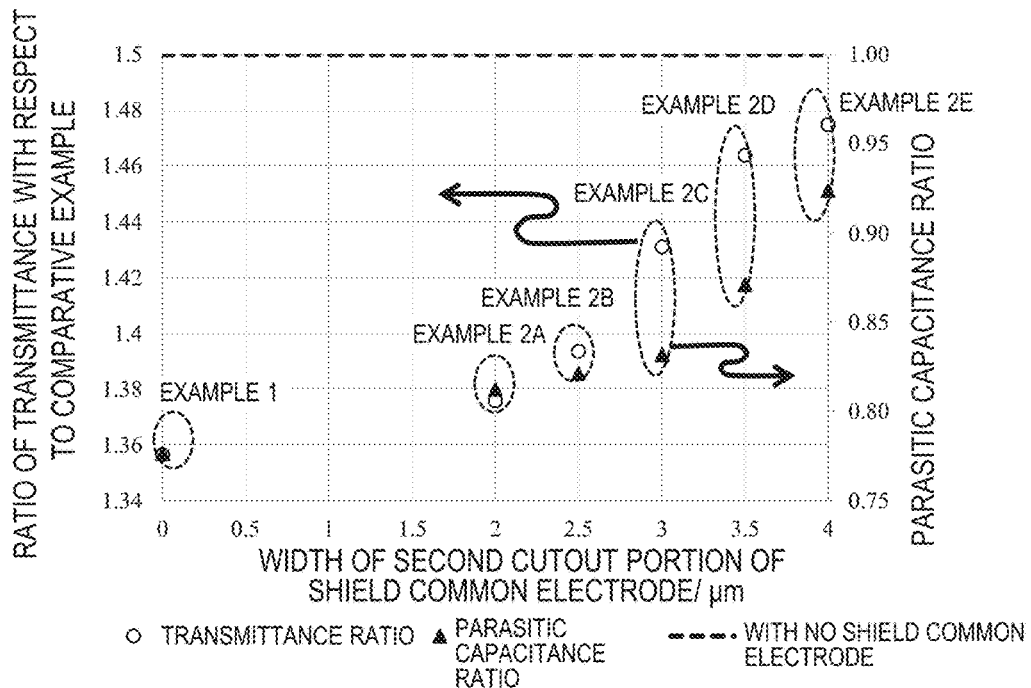
FIG. 10 is a graph showing ratios of the transmittance in examples 2A through 2E with respect to the transmittance in the comparative example, and also showing values of a parasitic capacitance between a source line 12 and a pixel electrode 15 in examples 2A through 2E, the values being normalized by the parasitic capacitance in a structure that does not include a shield common electrode 17 (such values are parasitic capacitance ratios).
Figure 11:
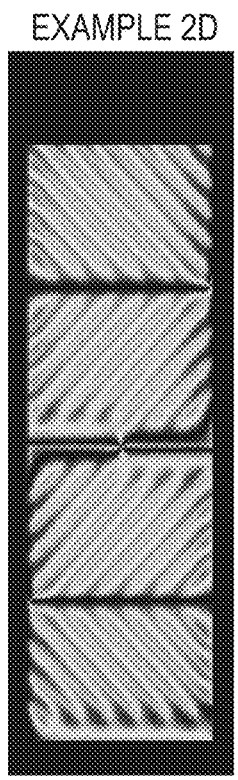
FIG. 11 shows a transmittance distribution, found by a simulation, in a pixel in example 2D during white display.

FIG. 10 shows the ratios of the transmittance in examples 2A through 2E with respect to the transmittance in the comparative example. FIG. 10 also shows values of the parasitic capacitance between the source line 12 and the pixel electrode 15 in examples 2A through 2E, the values being normalized by the parasitic capacitance in a structure that does not include the shield common electrode 17 (such normalized values are referred to as "parasitic capacitance ratios"). FIG. 11 shows a transmittance distribution in a pixel in example 2D during white display.

It is seen from FIG. 10 that the transmittance is higher in examples 2A through 2E than in the comparative example. It is also seen from FIG. 10 that the transmittance is higher in examples 2A through 2E than in example 1. It is further seen from FIG. 10 that as the width of each of the second cutout portions 17c is longer, the transmittance is higher. From the point of view of sufficiently improving the transmittance, it is preferred that the plurality of second cutout portions 17c each have a width longer than, or equal to, the width of each of the plurality of slits s (in this embodiment, 3.0 μm or longer). It should be noted that there is a tendency that when the width of each of the second cutout portions 17c is longer than 3.5 μm, the transmittance is not improved further. In addition, there is an undesirable possibility that when the width of each of the second cutout portions 17c is too long, the effect of decreasing the parasitic capacitance is declined. Therefore, from the point of view of sufficiently providing both of the effect of improving the transmittance efficiently and the effect of decreasing the parasitic capacitance, it is preferred that the width of each of the second cutout portions 17c is 3.5 μm or shorter.

From a comparison of FIG. 11 against FIG. 7 and FIG. 8 also, it is seen that the transmittance is higher in examples 2A through 2E than in example 1.

In this embodiment, a structure in which the liquid crystal domains are located in four rows by one column in a pixel is shown. Alternatively, a structure in which the four liquid crystal domains are located in two rows by two column may be adopted, and the second cutout portions 17c may be formed in the shield common electrode 17 in such a structure.

(Embodiment 3)

Figure 12:
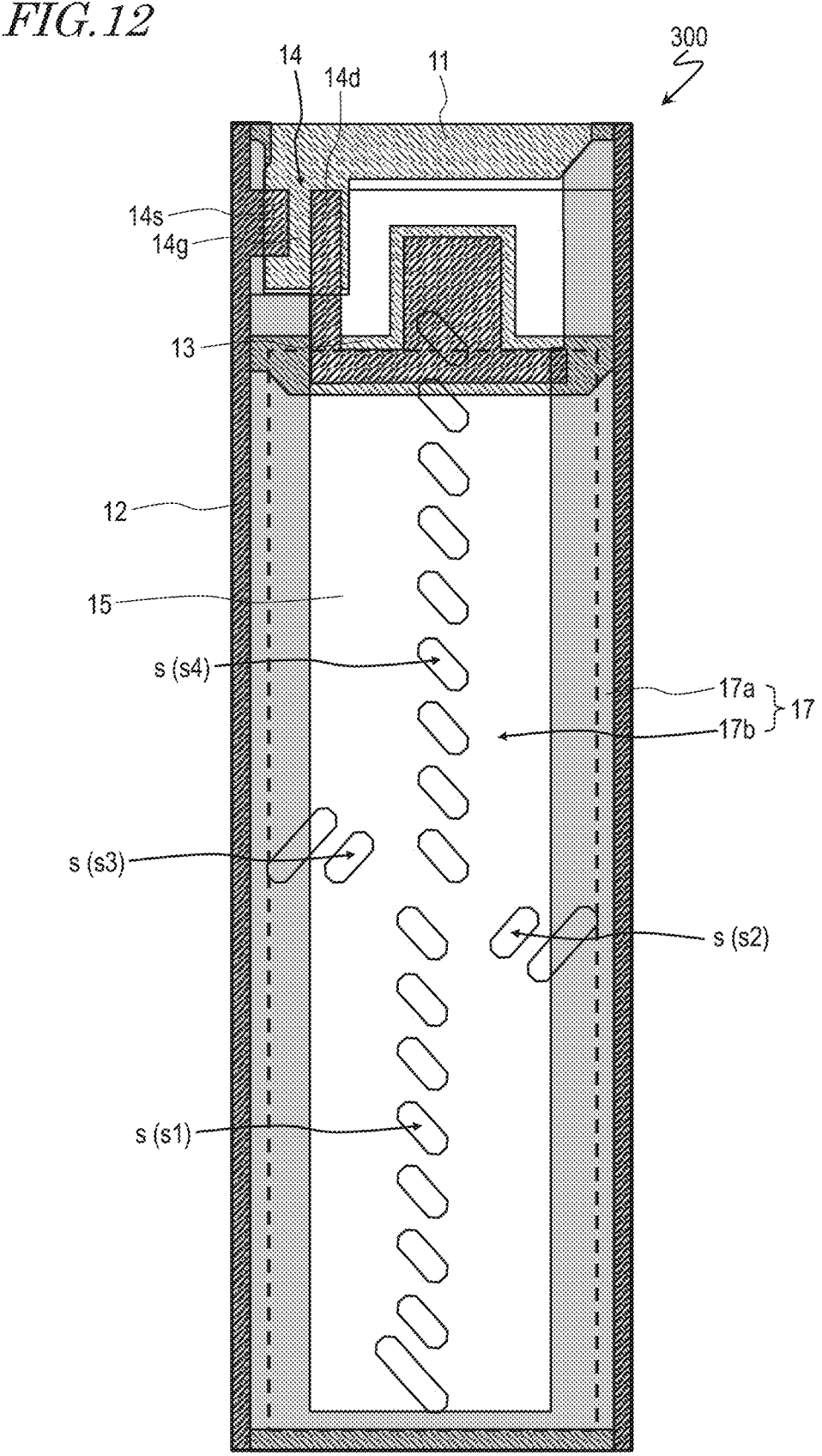
FIG. 12 is a plan view schematically showing a liquid crystal display device 300 according to still another embodiment of the present invention.
Figure 13:
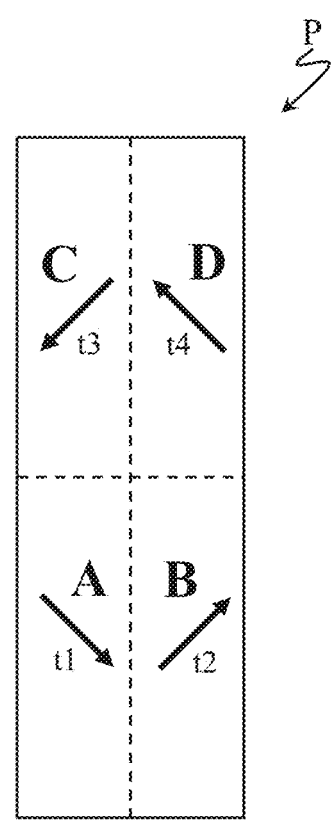
FIG. 13 shows an alignment division structure of a pixel P in the liquid crystal display device 300.

With reference to FIG. 12 and FIG. 13, a liquid crystal display device 300 according to this embodiment will be described. The liquid crystal display device 300 according to this embodiment is of the 4D-RTN mode. FIG. 12 is a plan view schematically showing the liquid crystal display device 300. FIG. 13 shows an alignment division structure of one pixel P in the liquid crystal display device 300. Hereinafter, differences of the liquid crystal display device 300 from the liquid crystal display device 100 according to embodiment 1 will be mainly described.

In the liquid crystal display device 300 according to this embodiment, as shown in FIG. 13, the four liquid crystal domains A, B, C and D are located in two rows by two columns in each of the pixels P. More specifically, the liquid crystal domains A, B, C and D are respectively located in a left bottom region, a right bottom region, a left top region and a right top region in each pixel P.

Figure 14A:
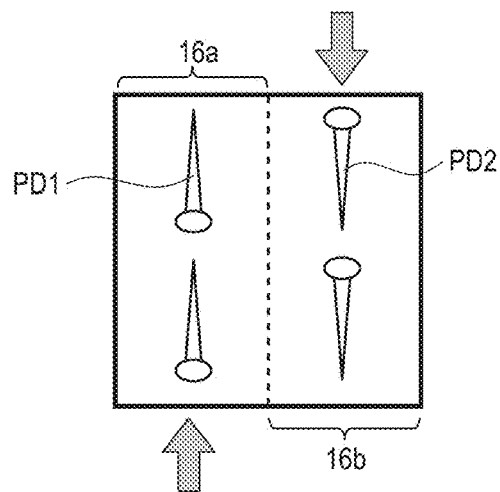
FIG. 14A is provided to illustrate a method for providing the alignment division structure of the pixel P, and shows pretilt directions PD1 and PD2 defined by a first alignment film of an active matrix substrate.
Figure 14B:
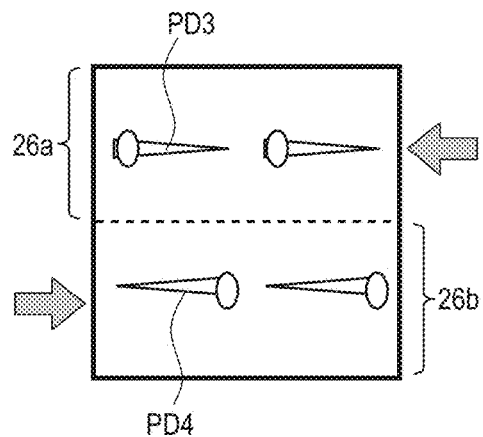
FIG. 14B is provided to illustrate the method for providing the alignment division structure of the pixel P, and shows pretilt directions PD3 and PD4 defined by a second alignment film of a counter substrate.
Figure 14C:
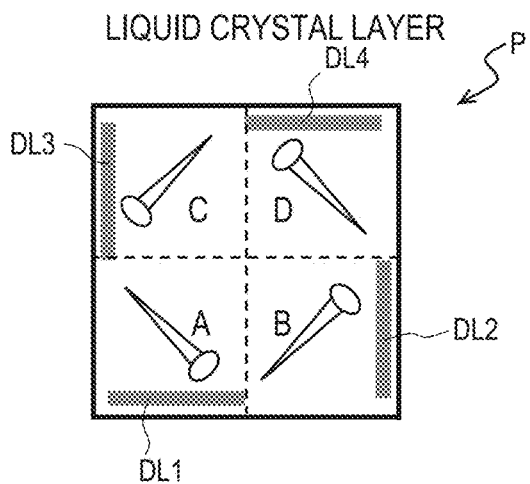
FIG. 14C is provided to illustrate the method for providing the alignment division structure of the pixel P, and shows tilt directions (directors) when a voltage is applied to a liquid crystal layer after the active matrix substrate and the counter substrate are assembled together.

Now, with reference to FIG. 14A, FIG. 14B and FIG. 14C, an alignment division method for providing the alignment division structure of the pixel P will be described. FIG. 14A shows pretilt directions PD1 and PD2 defined by a first alignment film provided in an active matrix substrate. FIG. 14B shows pretilt directions PD3 and PD4 defined by a second alignment film provided in a counter substrate. FIG. 14C shows tilt directions (directors) provided when a voltage is applied to a liquid crystal layer after the active matrix substrate and the counter substrate are assembled together.

As shown in FIG. 14A, the first alignment film includes, in each pixel P, a first pretilt region 16a and a second pretilt region 16b, which respectively define the first pretilt direction PD1 and the second pretilt direction PD2 different from each other. Specifically, a region, of the first alignment film, corresponding to one pixel P is divided into two in a left-right direction, and the two regions (the first pretilt region and the second pretilt region) 16a and 16b have been subjected to a photo alignment treatment so as to respectively define the pretilt directions different from each other (the first pretilt direction and the second pretilt direction) PD1 and PD2. In this embodiment, the photo alignment treatment is performed by oblique irradiation with ultraviolet rays (e.g., linearly polarized ultraviolet rays) in directions represented by the arrows.

As shown in FIG. 14B, the second alignment film includes, in each pixel P, a third pretilt region 26a and a fourth pretilt region 26b, which respectively define the third pretilt direction PD3 and the fourth pretilt direction PD4 different from each other. Specifically, a region, of the second alignment film, corresponding to one pixel P is divided into two in the up-down direction, and the two regions (the third pretilt region and the fourth pretilt region) 26a and 26b have been subjected to a photo alignment treatment so as to respectively define the pretilt directions different from each other (the third pretilt direction and the fourth pretilt direction) PD3 and PD4. In this embodiment, the photo alignment treatment is performed by oblique irradiation with ultraviolet rays (e.g., linearly polarized ultraviolet rays) in directions represented by the arrows.

The active matrix substrate and the counter substrata subjected to the photo alignment treatment as shown in FIG. 14A and FIG. 14B are assembled together, and as a result, the pixel P having the alignment division structure as shown in FIG. 14C may be formed. In each of the liquid crystal domains A through D, the pretilt direction defined by the first alignment film included in the active matrix substrate and the pretilt direction defined by the second alignment film included in the counter substrate are different from each other by about 90 degrees. A tilt direction (azimuth of the director in each of the liquid crystal domains) is defined by these two pretilt directions. As shown, the tilt direction is defined at a direction at the middle between the two pins corresponding to the two pretilt directions.

In the pixel P having the alignment division structure, dark lines DL1, DL2, DL3 and DL4 are generated in the vicinity of the edges of the pixel electrode 15 for the above-described reason.

As shown in FIG. 12, the plurality of slits s of the pixel electrode 15 include a plurality of first slits s1, a plurality of second slits s2, a plurality of third slits s3, and a plurality of fourth slits s4.

The plurality of first slits s1 are formed in the vicinity of a border between the liquid crystal domain A and the liquid crystal domain B, and extend generally parallel to the director t1 of the liquid crystal domain A. The plurality of second slits s2 are formed in the vicinity of a border between the liquid crystal domain B and the liquid crystal domain D, and extend generally parallel to the director t2 of the liquid crystal domain B. The plurality of third slits s3 are formed in the vicinity of a border between the liquid crystal domain C and the liquid crystal domain A, and extend generally parallel to the director t3 of the liquid crystal domain C. The plurality of fourth slits s4 are formed in the vicinity of a border between the liquid crystal domain C and the liquid crystal domain D, and extend generally parallel to the director t4 of the liquid crystal domain D.

In the liquid crystal display device 300 according to this embodiment also, the shield common electrode 17 includes a first cutout portion 17b including portions overlapping the plurality of slits s of the pixel electrode 15. Such a structure may improve the transmittance.

Figure 15:
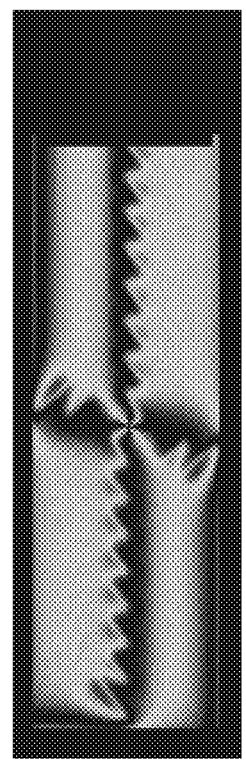
FIG. 15 shows a transmittance distribution, found by a simulation, in a pixel in example 3 during white display.

Now, a structure in which the first cutout portion 17b of the shield common electrode 17 is rectangular and has a width of 40 μm wilt be provided as example 3. FIG. 15 shows a transmittance distribution in a pixel in example 3 during white display. It has been confirmed from FIG. 15 that the effect of improving the transmittance is provided.

As described above, a liquid crystal display device of the 4D-RTN mode including a pixel electrode having slits formed therein is disclosed in, for example, Patent Document 1.

(Embodiment 4)

Figure 16:
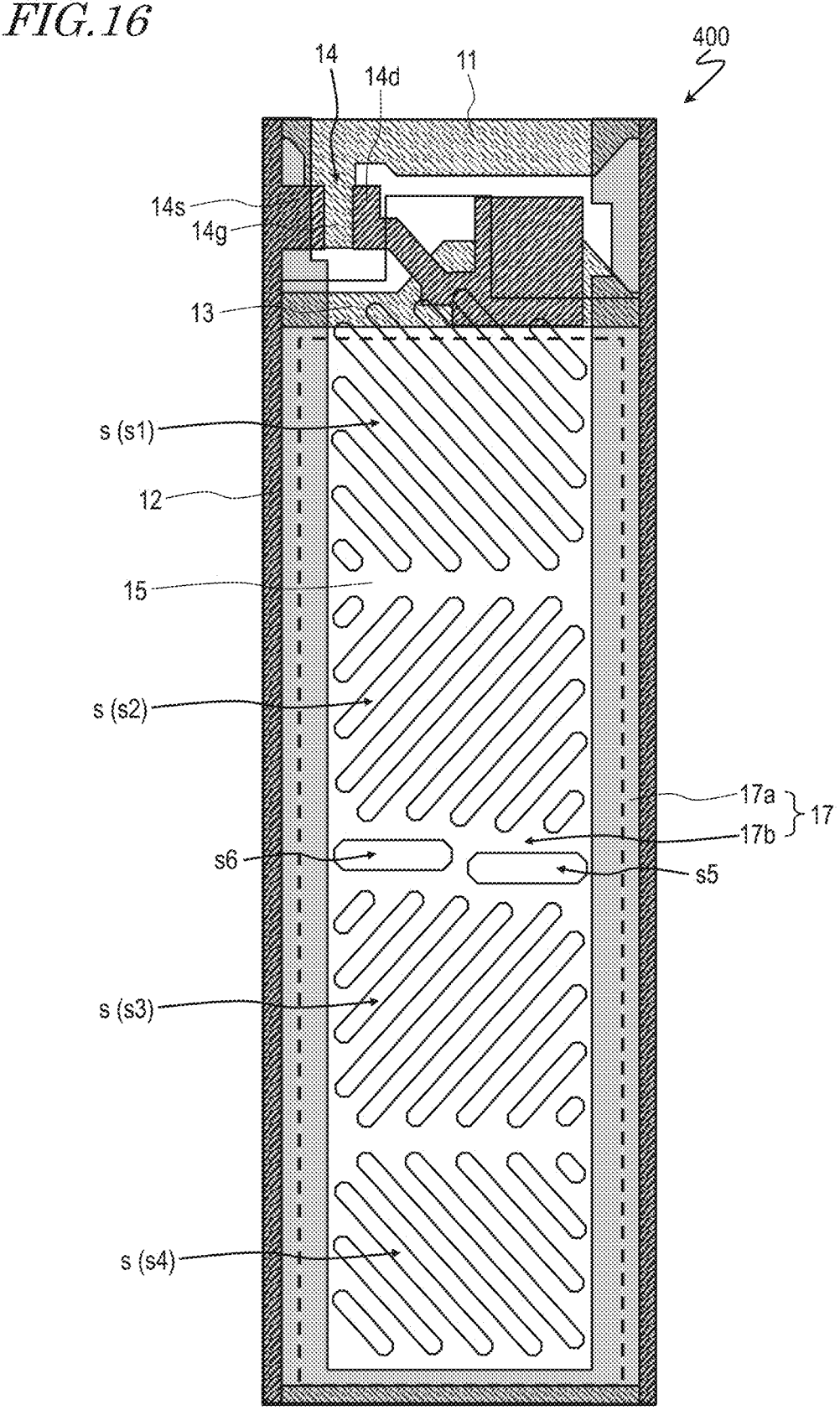
FIG. 16 is a plan view schematically showing a liquid crystal display device 400 according to still another embodiment of the present invention.

With reference to FIG. 16, a liquid crystal display device 400 according to this embodiment will be described. The liquid crystal display device 400 according to this embodiment is of the 4D-ECB mode. FIG. 16 is a plan view schematically showing the liquid crystal display device 400. Hereinafter, differences of the liquid crystal display device 400 from the liquid crystal display device 100 according to embodiment 1 will be mainly described.

The pixels in the liquid crystal display device 400 according to this embodiment each have the same alignment division structure as that of the pixel P in the liquid crystal display device 100 according to embodiment 1 (see FIG. 3). As shown in FIG. 16, the shield common electrode 17 in the liquid crystal display device 400 according to this embodiment includes a first cutout portion 17b including portions overlapping the plurality of slits s of the pixel electrode 15, like the shield common electrode 17 in the liquid crystal display device 100 according to embodiment 1.

In embodiment 1, a part of the slits s of the pixel electrode 15 partially overlap the solid portion 17a of the shield common electrode 17. By contrast, in this embodiment, the plurality of slits s of the pixel electrode 15 are formed to be slightly shorter, and therefore, none of the plurality of slits s overlaps the solid portion 17a of the shield common electrode 17.

Figure 17:
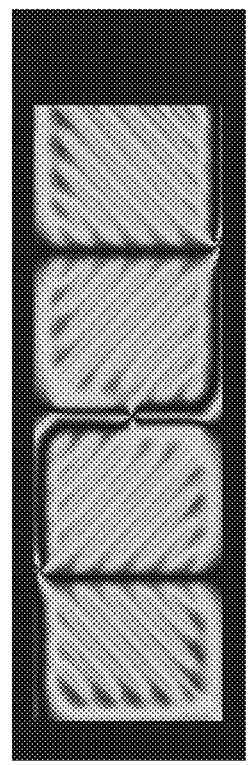
FIG. 17 shows a transmittance distribution, found by a simulation, in a pixel in example 4 during white display.

Now, a structure in which the first cutout portion 17b of the shield common electrode 17 is rectangular and has a width of 40 μm will be provided as example 4. Table 2 shows the transmittance in each of example A and the comparative example found by a simulation. FIG. 17 shows a transmittance distribution in a pixel in example 4 during white display.

TABLE 2

|  | EXAMPLE 4 | COMPARATIVE EXAMPLE |
|---|---|---|
| BOTTOM SIDE | 66.2% | 44.4% |
| TOP SIDE | 61.0% | 43.4% |
| AVERAGE | 63.6% | 43.9% |

It is seen from Table 2 that the transmittance is higher in example 4 than in the comparative example. From a comparison between FIG. 17 and FIG. 8 also, it is seen that the transmittance is higher in example 4 than in the comparative example. From a comparison between Table 2 and Table 1 and a comparison between FIG. 17 and FIG. 7, it is seen that the transmittance is higher in example 4 than in example 1.

As can be seen, in the case where the silts s of the pixel electrode 15 are formed to have such a length as not to overlap the solid portion 17a of the shield common electrode 17, the transmittance may be made higher than that in example 1.

(Embodiment 5)

Figure 18:
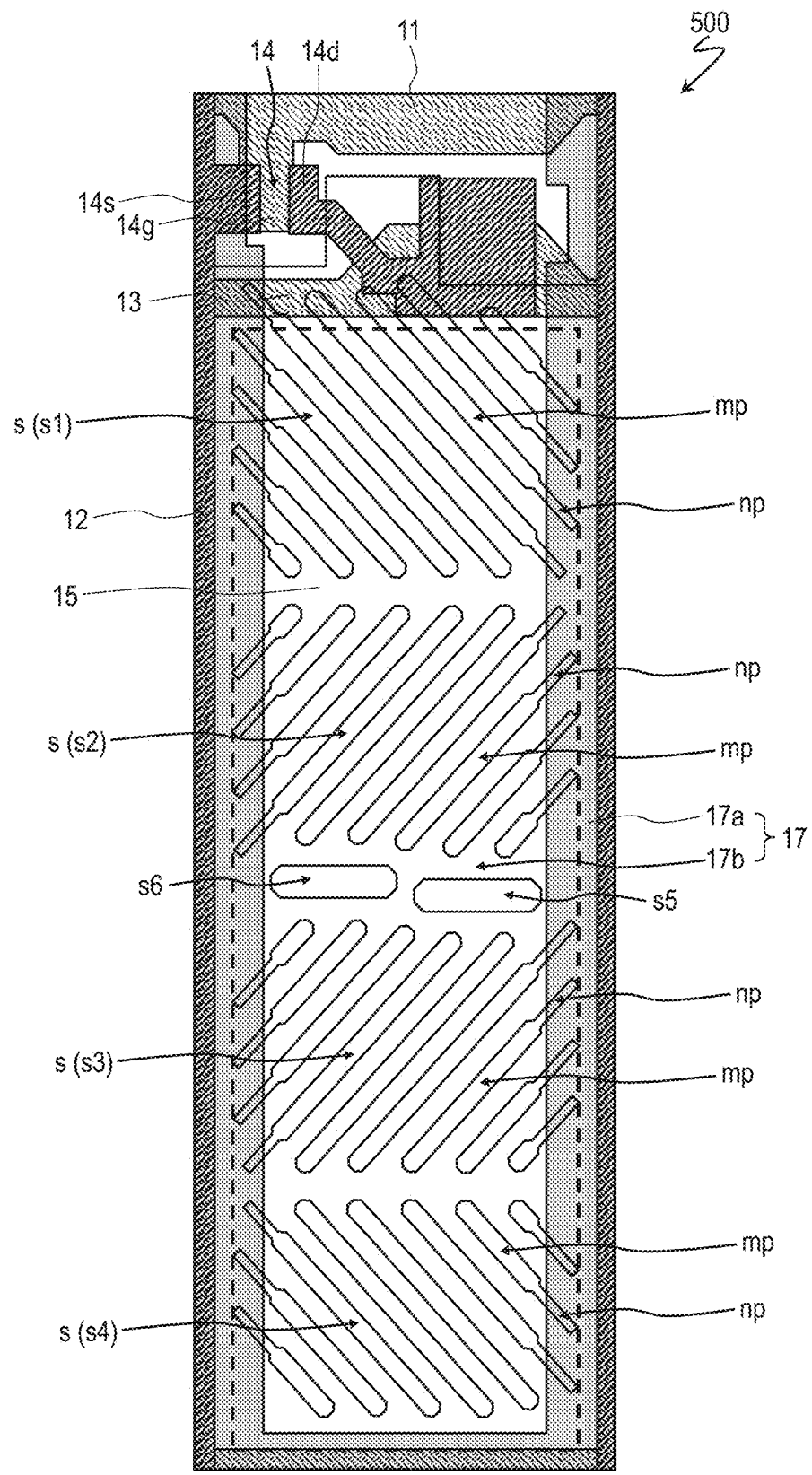
FIG. 18 is a plan view schematically showing a liquid crystal display device 500 according to still another embodiment of the present invention.

With reference to FIG. 18, a liquid crystal display device 500 according to this embodiment will be described. The liquid crystal display device 500 according to this embodiment is of the 4D-ECB mode. FIG. 18 is a plan view schematically showing the liquid crystal display device 500.

The pixels in the liquid crystal display device 500 according to this embodiment each have the same alignment division structure as that of the pixel P in the liquid crystal display device 100 according to embodiment 1 (see FIG. 3). As shown in FIG. 18, the shield common electrode 17 in the liquid crystal display device 500 according to this embodiment includes a solid portion 17a and a first cutout portion 17b, like the shield common electrode 17 in the liquid crystal display device 100 according to embodiment 1. As seen in the direction normal to the display plane, the solid portion 17a overlaps the plurality of source lines 12, and also overlaps one end portion and the other end portion (in this example, a right end portion and a left end portion) of two end portions, in the row direction, of the pixel electrode 15. In each of the pixels, the first cutout portion 17b is formed across a region corresponding to the liquid crystal domain A, a region corresponding to the liquid crystal domain B, a region corresponding to the liquid crystal domain C, and a region corresponding to the liquid crystal domain D. The first cutout portion 17b includes portions overlapping the plurality of silts s as seen in the direction normal to the display plane.

In this embodiment, at least a part of the plurality of slits s each include a main portion mp and a narrow portion np narrower than the main portion mp. As seen in the direction normal to the display plane, the narrow portion np overlaps the solid portion 17a of the shield common electrode 17.

More specifically, the plurality of first slits s1 include slits s1 each including the narrow portion np located on the side of the first edge portion EG1 (i.e., on the right side) and slits s1 each including the narrow portion np located on the side opposite to the first edge portion EG1 (i.e., on the left side). Similarly, the plurality of second slits s2 include slits s2 each including the narrow portion np located on the side of the second edge portion EG2 (i.e., on the right side) and slits s2 each including the narrow portion np located on the side opposite to the second edge portion EG2 (i.e., on the left side). The plurality of third slits s3 include silts s3 each including the narrow portion np located on the side of the third edge portion EG3 (i.e., on the left side) and silts s3 each including the narrow portion np located on the side opposite to the third edge portion EG3 (i.e., on the right side). Similarly, the plurality of third slits s4 include slits s4 each including the narrow portion np located on the side of the fourth edge portion EG4 (i.e., on the left side) and slits s4 each including the narrow portion np located on the side opposite to the fourth edge portion EG4 (i.e., on the right side).

In this manner, the narrow portions np are present on both of the top side and the bottom side in each of the liquid crystal domains A through D.

As described above, in the liquid crystal display device 500 according to this embodiment, the active matrix substrate includes the shield common electrode 17. With such a structure, the parasitic capacitance between the source line 12 and the pixel electrode 15 may be decreased to improve the numerical aperture. In addition, the shield common electrode 17 includes the first cutout portion 17b. With such a structure, the transmittance may be improved. In a region of the pixel electrode 15 overlapping the solid portion 17a of the shield common electrode 17, the width of each of the slits s is shorter. Such a structure my further improve the transmittance.

Now, a structure in which the main portion mp has a width of 3.0 μm and the narrow portion np has a width of 1.4 μm is provided as example 5. Regarding example 5, the effect of improving the transmittance was examined, and the results thereof will be described. For the examination, example 5, the liquid crystal display device 100 shown in FIG. 1 and the liquid crystal display device 800 in the comparative example shown in FIG. 6 were compared with each other.

In the liquid crystal display device 100 in example 1, the plurality of slits s of the pixel electrode 15 each have a width that is constant over the entire length thereof (specifically, 3.0 μm), unlike in example 5. Namely, in the liquid crystal display device 100 in example 1, a portion of each slit s overlapping the solid portion 17a of the shield common electrode 17 and a portion of each slit s not overlapping the solid portion 17a both have a width of 3.0 μm. In the liquid crystal display device 800 in the comparative example, the shield common electrode 17 does not have any cutout portion including portions overlapping the plurality of slits s of the pixel electrode 15, unlike in example 5.

Figure 19:
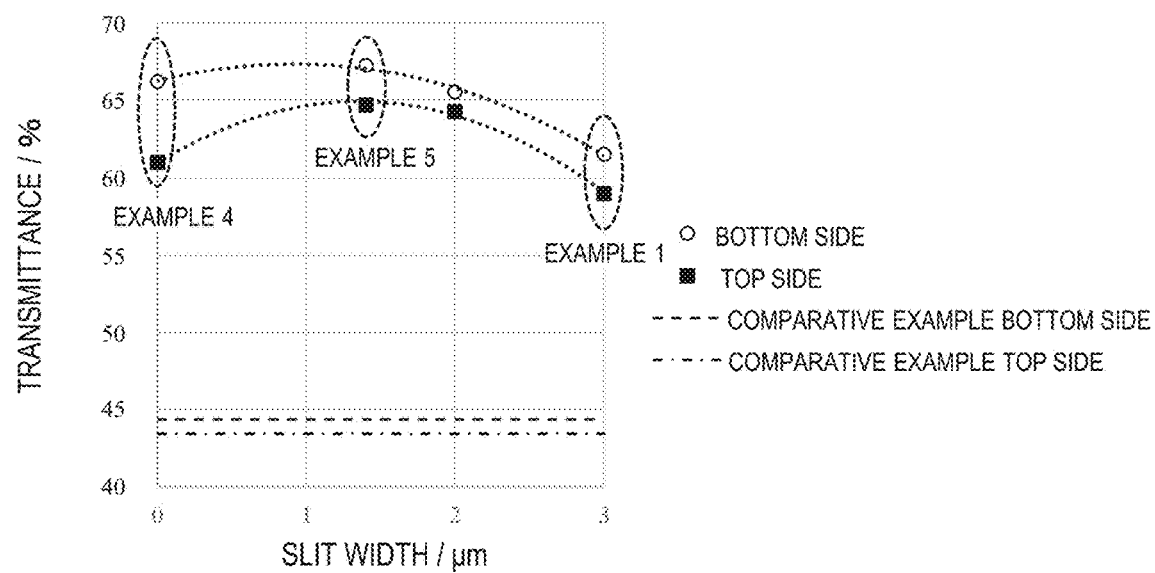
FIG. 19 is a graph showing the transmittance in each of example 1, example 5 and the comparative example found by a simulation.
Figure 20:
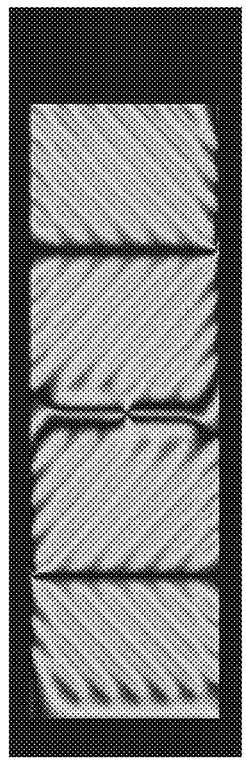
FIG. 20 shows a transmittance distribution, found by a simulation, in a pixel in example 5 during white display.

FIG. 19 shows the transmittance in each of example 1, example 5 and the comparative example found by a simulation. FIG. 20 shows a transmittance distribution in a pixel in example 5 during white display.

It is seen from FIG. 19 that the transmittance is higher in example 5 than in the comparative example and example 1. Specifically, the transmittance in example 5 was about 1.47 times the transmittance in the comparative example, and was about 1.09 times the transmittance in example 1. It is also seen that the transmittance has a peak in the range of the width of the slit s (width of the narrow portion np) of 1.0 μm or longer and 1.5 μm or shorter on both of the top side and the bottom side.

From a comparison of FIG. 20 against FIG. 7 and FIG. 8, it is seen that the transmittance is higher in example 5 than in the comparative example and example 1. As shown in FIG. 8, in the comparative example, generally the entirety of the pixel is darker than in example 5. As shown in FIG. 7, in example 1, the pixel is darker than in example 5 on both of the top side and the bottom side.

FIG. 18 shows an example in which a part of the plurality of slits s each include the narrow portion np. The embodiment of the present Invention is not limited to having such a structure. In the case where the slits s are located in a particular manner, all the slits s may overlap the solid portion 17a of the shield common electrode 17. In such a case, all the slits s may each include the narrow portion np.

The width of each of the plurality of slits s (width of the main portion mp) is not limited to 3.0 μm as shown here. The formation pitch of the first slits s1 (sum of the width of the main portion mp of each of the first slits s1 and the interval between the each first slit s1 and another first slit s1 adjacent thereto) is preferably 7.0 μm or shorter from the point of view of improving the transmittance, and is preferably 5.2 μm or longer from the point of view of facilitating the production. Similarly, the formation pitches of the second slits s2, the third slits s3 and the fourth slits s4 are each preferably 7.0 μm or shorter from the point of view of improving the transmittance, and are each preferably 5.2 μm or longer from the point of view of facilitating the production.

(Embodiment 6)

Figure 21:
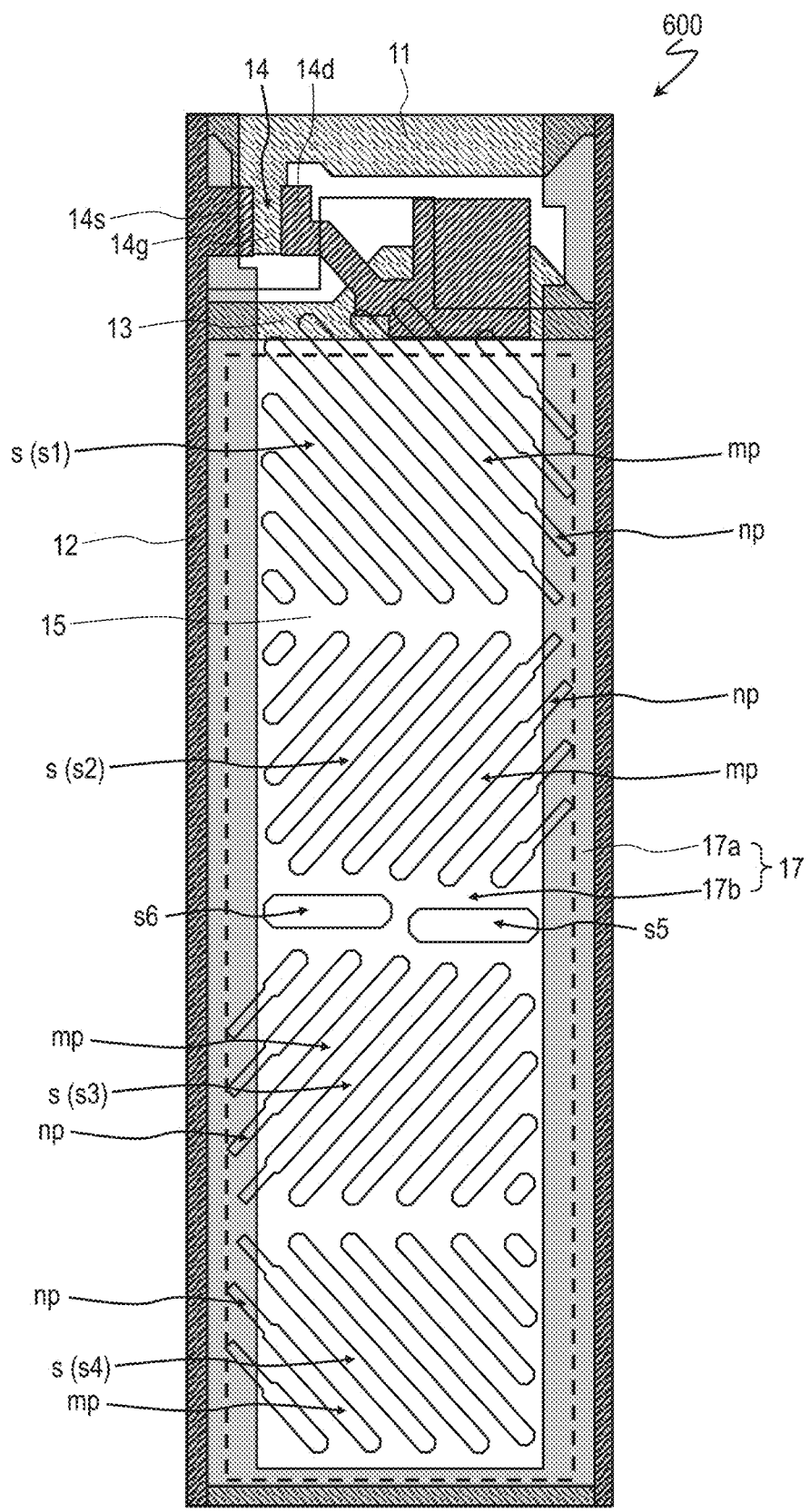
FIG. 21 is a plan view schematically showing a liquid crystal display device 600 according to still another embodiment of the present invention.

With reference to FIG. 21, a liquid crystal display device 600 according to this embodiment will be described. FIG. 21 is a plan view schematically showing the liquid crystal display device 600. Hereinafter, differences of the liquid crystal display device 600 from the liquid crystal display device 500 according to embodiment 5 will be mainly described.

The pixels in the liquid crystal display device 600 according to this embodiment each have the same alignment division structure as that of the pixel P in the liquid crystal display device 500 according to embodiment 5 (see FIG. 3). It should be noted that in the liquid crystal display device 600, each of the slits s includes the narrow portion np on the top side but not on the bottom side in each of the liquid crystal domains. The slits s do not overlap the solid portion 17a of the shield common electrode 17 on the bottom side.

Specifically, the plurality of first slits s1 include slits s1 each including the narrow portion np on the side of the first edge portion EG1 (i.e., on the right side), but do not include any slit including the narrow portion np on the side opposite to the first edge portion EG1 (i.e., on the left side). Similarly, the plurality of second slits s2 include slits s2 each including the narrow portion np on the side of the second edge portion EG2 (i.e., on the right side), but do not include any slit including the narrow portion np on the side opposite to the second edge portion EG2 (i.e., on the left side). The plurality of third slits s3 include slits s3 each including the narrow portion np on the side of the third edge portion EG3 (i.e., on the left side), but do not include any slit including the narrow portion np on the side opposite to the third edge portion EG3 (i.e., on the right side). Similarly, the plurality of fourth slits s4 include slits s4 each including the narrow portion np on the side of the fourth edge portion EG4 (i.e., on the left side), but do not include any slit including the narrow portion np on the side opposite to the fourth edge portion EG4 (i.e., on the right side).

Now, a structure in which the main portion mp has a width of 3.0 μm and the narrow portion np has a width of 2.0 μm is provided as example 6. Regarding example 6, the effect of improving the transmittance was examined, and the results thereof will be described. For the examination, example 6, example 1 and the comparative example were compared with each other.

Figure 22:
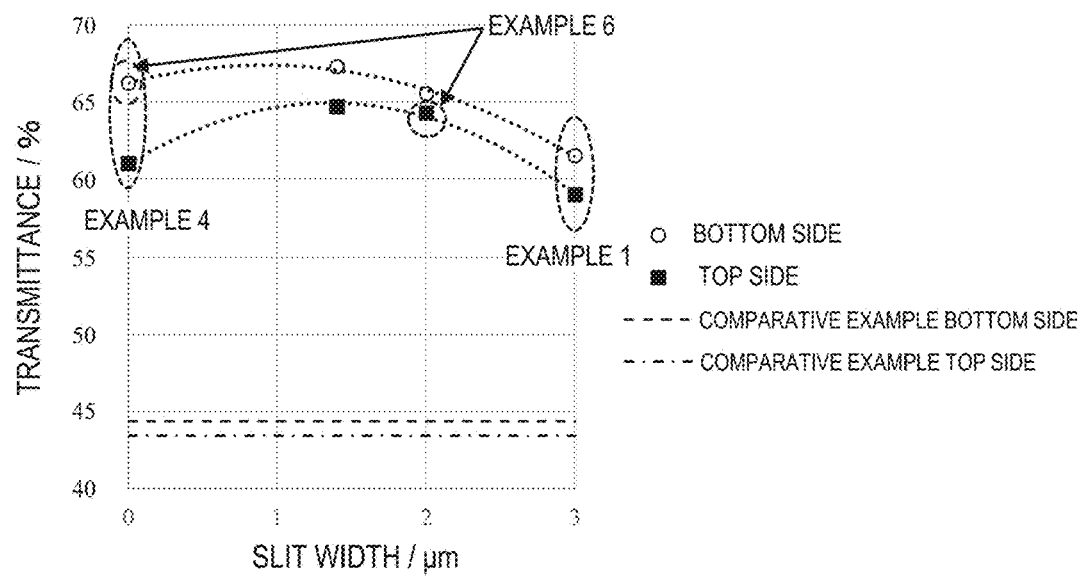
FIG. 22 is a graph showing the transmittance in each of example 1, example 6 and the comparative example found by a simulation.
Figure 23:
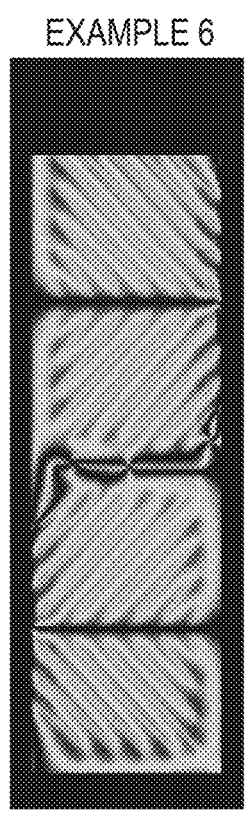
FIG. 23 shows a transmittance distribution, found by a simulation, in a pixel in example 6 during white display.

FIG. 22 shows the transmittance in each of example 6, example 1 and the comparative example found by a simulation. FIG. 23 shows a transmittance distribution in a pixel in example 6 during white display.

It is seen from FIG. 22 that the transmittance is higher in example 6 than in the comparative example and example 1. Specifically, the transmittance in example 6 was about 1.46 times the transmittance in the comparative example, and was about 1.07 times the transmittance in example 1. From a comparison of FIG. 23 against FIG. 7 and FIG. 8 also, it is seen that the transmittance is higher in example 6 than in the comparative example and example 1.

As described above, even in the case where the slits s each include the narrow portion np only on the top side, the transmittance may be sufficiently improved. No dark line is generated on the bottom side. Therefore, even though the slits s do not overlap the solid portion 17a of the shield common electrode 17 on the bottom side, the loss in the transmittance, which would be otherwise caused due to the displacement of the dark line to the internal region, is not caused.

It is seen from FIG. 22 that even though the narrow portions np are wider on the top side than on the bottom side, (even though the narrow portions np are 2.0 μm-wide on the top side), the transmittance close to the peak may be maintained. Therefore, in the liquid crystal display device 600 in this embodiment, the width of the slits s (width of each of the narrow portions np) is easily made longer, which may easily decrease the non-uniformity caused by the production variance.

(Embodiment 7)

Figure 24:
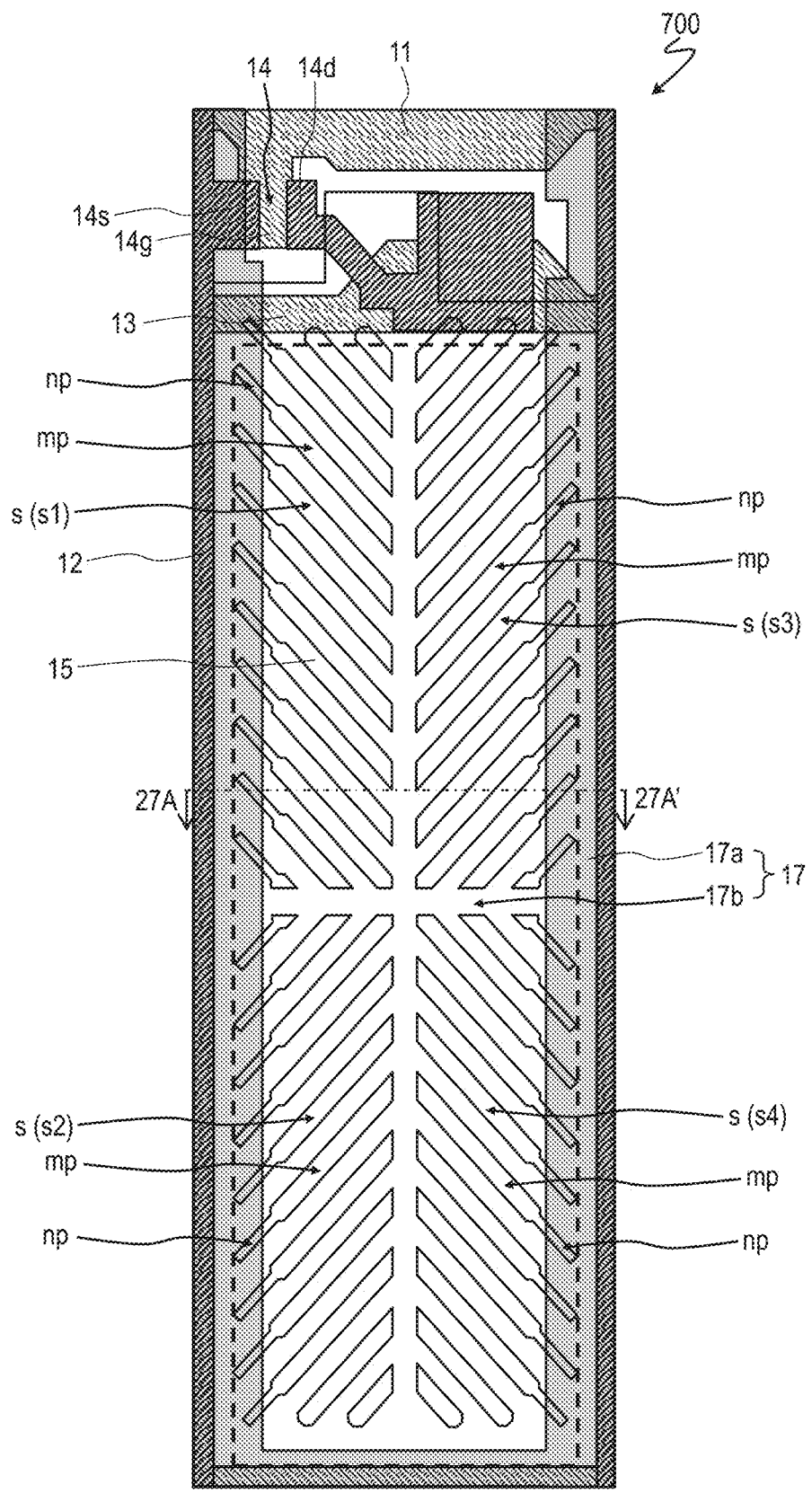
FIG. 24 is a plan view schematically showing a liquid crystal display device 700 according to still another embodiment of the present invention.
Figure 25:
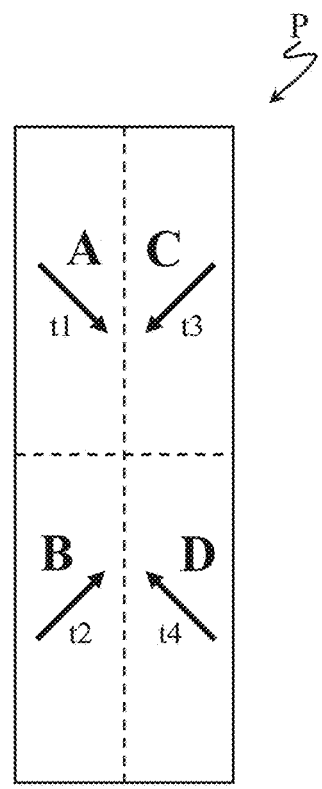
FIG. 25 shows an alignment division structure of a pixel P in the liquid crystal display device 700.

With reference to FIG. 24 and FIG. 25, a liquid crystal display device 700 according to this embodiment will be described. FIG. 24 is a plan view schematically showing the liquid crystal display device 700. FIG. 25 shows an alignment division structure of one pixel P in the liquid crystal display device 700. Hereinafter, differences of the liquid crystal display device 700 from the liquid crystal display device 100 according to embodiment 1 will be mainly described.

In the liquid crystal display device 700 according to this embodiment, as shown in FIG. 25, the four liquid crystal domains A, B, C and D are located in two rows by two columns in each of the pixels P. Here specifically, the liquid crystal domains A, B, C and D are respectively located in a left top region, a left bottom region, a right top region and a right bottom region in each pixel P.

As shown in FIG. 24, the plurality of slits s of the pixel electrode 15 include a plurality of first slits s1, a plurality of second slits s2, a plurality of third slits s3, and a plurality of fourth silts s4.

The plurality of first slits s1 are formed in a region corresponding to the liquid crystal domain A, and extend generally parallel to the director t1 of the liquid crystal domain A. The plurality of second slits s2 are formed in a region corresponding to the liquid crystal domain B, and extend generally parallel to the director t2 of the liquid crystal domain B. The plurality of third slits s3 are formed in a region corresponding to the liquid crystal domain C, and extend generally parallel to the director t3 of the liquid crystal domain C. The plurality of fourth slits s4 are formed in a region corresponding to the liquid crystal domain D, and extend generally parallel to the director t4 of the liquid crystal domain D.

At least a part of the plurality of slits s each include a main portion mp and a narrow portion np narrower than the main portion mp. As seen in the direction normal to the display plane, the narrow portion np overlaps the solid portion 17a of the shield common electrode 17.

Specifically, the plurality of first slits s1 include slits s1 each including the narrow portion np. The plurality of second slits s2 include slits s2 each including the narrow portion np. Similarly, the plurality of third slits s3 include slits s3 each including the narrow portion np. Similarly, the plurality of third slits s4 include slits s4 each including the narrow portion np.

In the liquid crystal display device 700 according to this embodiment also, in a region of the pixel electrode 15 overlapping the solid portion 17a of the shield common electrode 17, the width of each of the slits s is shorter. Such a structure may further improve the transmittance.

Figure 26:
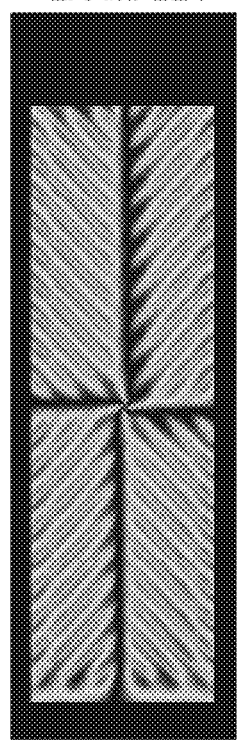
FIG. 26 shows a transmittance distribution, found by a simulation, in a pixel in example 7 during white display.

Now, a structure in which the main portion mp has a width of 3.0 μm and the narrow portion np has a width of 1.4 μm is provided as example 7. FIG. 26 shows a transmittance distribution in a pixel in example 7 during white display.

It is seen from FIG. 26 that in example 7, the region of the pixel electrode 15 overlapping the solid portion 17a of the shield common electrode 17 (the left end portion and the right end portion of the pixel electrode 15) is bright and has an improved transmittance.

In the alignment division structure shown in FIG. 25, the edge, or the vicinity thereof, of the pixel electrode 15 is on the bottom side, but not on the top side in each of the liquid crystal domains A through D. It is preferred that the width of each of the narrow portions np is 1.0 μm or longer and 1.5 μm or shorter.

Figure 27:
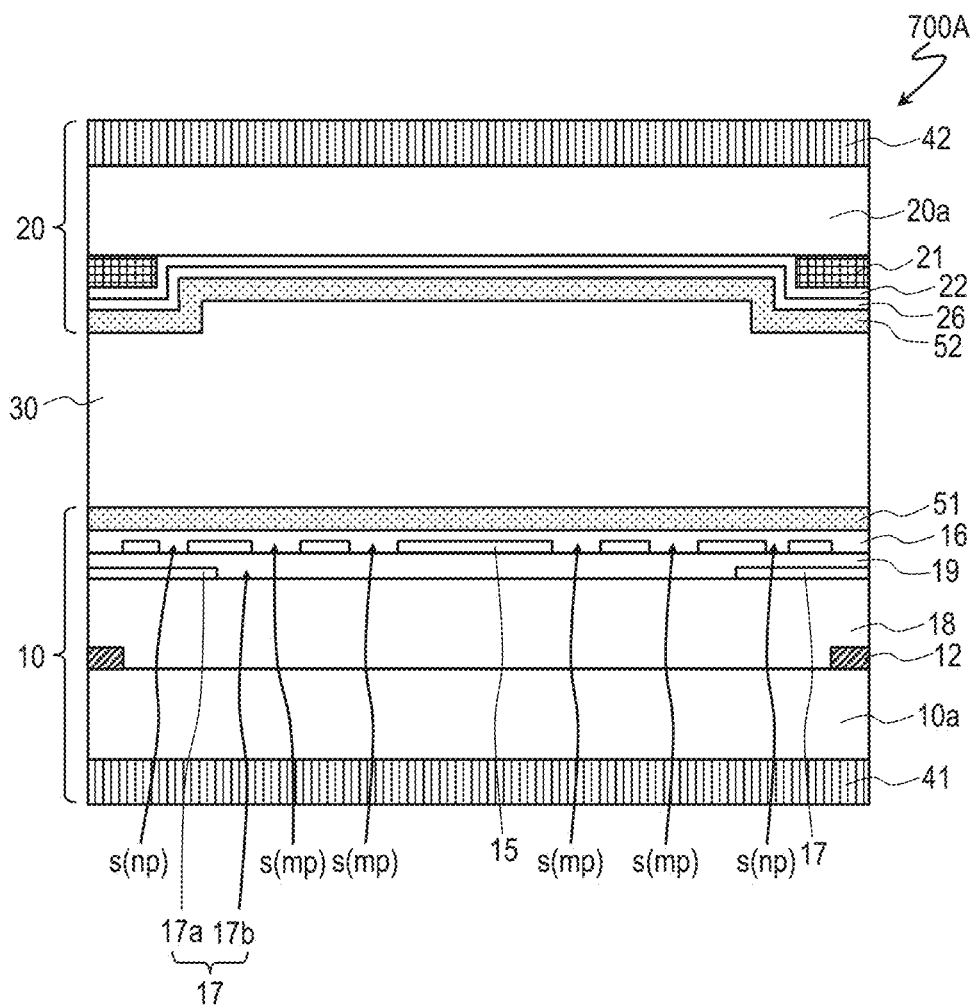
FIG. 27 is a cross-sectional view schematically showing a liquid crystal display device 700A according to still another embodiment of the present invention.

The alignment division structure shown in FIG. 25 may be realized by the PSA technology. FIG. 27 shows a liquid crystal display device 700A, in which the alignment division structure shown in FIG. 25 is realized by the PSA technology. FIG. 27 shows a cross-sectional structure corresponding to a cross-sectional structure taken along line 27A-27A' in FIG. 24.

As shown in FIG. 27, the liquid crystal display device 700A includes a pair of alignment sustaining layers 51 and 52 formed of a photopoiymerized material. The alignment sustaining layers 51 and 52 are respectively provided on surfaces, of the first alignment film 16 and the second alignment film 17, closer to the liquid crystal layer 30. The alignment sustaining layers 51 and 52 are formed by polymerizing a photopolymerizable compound incorporated into a liquid crystal material in advance, in a state where a voltage is applied to the liquid crystal layer 30. The alignment sustaining layers 51 and 52 define the pretilt. directions of the liquid crystal molecules in a state where no voltage is applied to the liquid crystal layer 30.

The alignment sustaining layers 51 and 52 formed in a state where a white display voltage is applied act to maintain (store), even after the voltage is removed (in a state where no voltage is applied), the alignment of the liquid crystal molecules in the state where the white display voltage is applied. In FIG. 27, the alignment sustaining layers 51 and 52 are continuous layers extending in the entirety of the surfaces of the first alignment film 16 and the second alignment film 26. Alternatively, the alignment sustaining layers 51 and 52 may be formed discontinuously on the surfaces of the first alignment film 16 and the second alignment film 26.

The liquid crystal display device 700A includes the above-described alignment sustaining layers 51 and 52. Therefore, the liquid crystal layer 30 exhibits an alignment state where the liquid crystal molecules are pre-tilted in predetermined directions in the absence of a voltage. Such an alignment state matches the alignment state of the liquid crystal molecules in the white display state (in the presence of a voltage). Therefore, the alignment stability and the response characteristics are improved.

The technology of providing the above-described alignment sustaining layers 51 and 52 (PSA technology) is disclosed in, for example. Patent Document 3.

In the case where the PSA technology is used, if the slits s of the pixel electrode 15 are made too short in an attempt to prevent the slits s from overlapping the solid portion 17a of the shield common electrode 17, there is an undesirable possibility that the liquid crystal molecules are not aligned in desired directions and a preferred alignment division structure is not formed. Therefore, it is considered to be specifically useful to decrease the width of the slits s in the region of the pixel electrode 15 overlapping the solid portion 17a of the shield common electrode 17 as in this embodiment.

ANOTHER EMBODIMENT

In the case where the liquid crystal domains ere located in four rows by one column in each pixel, the specific arrangement of the liquid crystal domains is not limited to the example shown in FIG. 3. In the example shown in FIG. 3, the liquid crystal domain A (the reference alignment direction is a direction of about 315 degrees), the liquid crystal domain B (the reference alignment direction is a direction of about 45 degrees), the liquid crystal domain C (the reference alignment direction is a direction of about 225 degrees) and the liquid crystal domain D (the reference alignment direction is a direction of about 135 degrees) are located in this order in a longitudinal direction of the pixel P.

Figure 28:
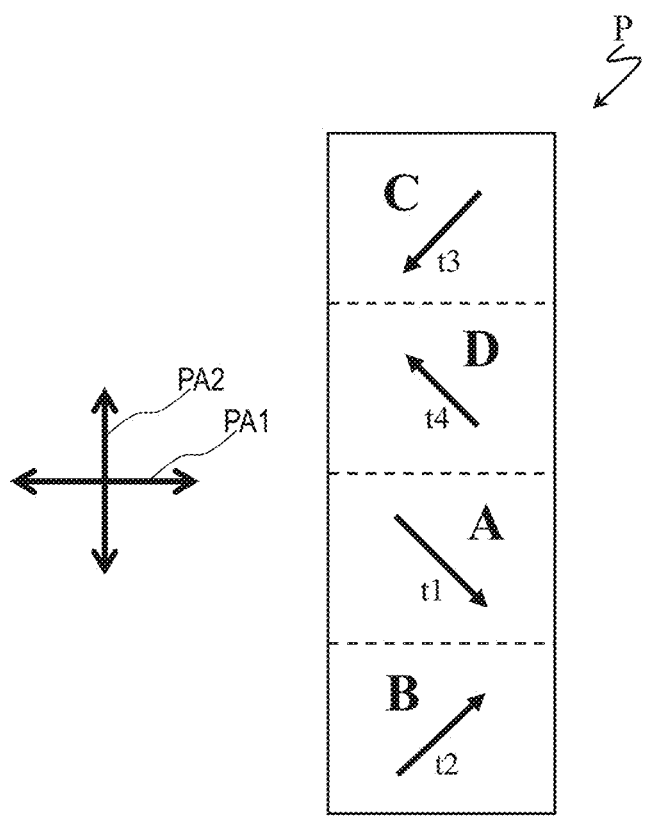
FIG. 28 shows another example of alignment division structure of the pixel P.

Alternatively, the arrangement shown in FIG. 29 may be adopted, in the example shown in FIG. 28, the liquid crystal domains C, D, A and B are located in this order from top to bottom (i.e., in the longitudinal direction of the pixel P), Even in the case where the arrangement shown in FIG. 28 is adopted, substantially the same effect as in the case where the arrangement shown in FIG. 3 is adopted may be provided.

According to the embodiments of the present invention, a liquid crystal display device of the 4D-RTN mode, a liquid crystal display device of the 4D-ECB mode and a liquid crystal display device using the PSA technology may have the transmittance thereof improved sufficiently while a pixel electrode having slits formed therein and a shield common electrode are used in combination.

This application claims priority under 35 USC § 119(e) to U.S. Provisional Application No. 63/171,342 filed on Apr. 7, 2021, the entire contents of which are hereby incorporated by reference.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:
1. A liquid crystal display device, comprising:
a first substrate and a second substrate facing each other; and
a vertical alignment-type liquid crystal layer provided between the first substrate and the second substrate,
wherein the liquid crystal display device includes a plurality of pixels arrayed in a matrix including a plurality of rows and a plurality of columns,
wherein the first substrate includes a plurality of gate lines extending in a row direction, a plurality of source lines extending in a column direction, a pixel electrode provided in each of the plurality of pixels, and a first alignment film provided between the pixel electrode and the liquid crystal layer, wherein the second substrate includes a common electrode facing the pixel electrode, and a second alignment film provided between the common electrode and the liquid crystal layer, wherein the plurality of pixels each include a first liquid crystal domain, a second liquid crystal domain, a third liquid crystal domain and a fourth liquid crystal domain, in which liquid crystal molecules at a center, or in the vicinity thereof, of a layer plane and a thickness direction of the liquid crystal layer have tilt directions that are respectively a predetermined first direction, a predetermined second direction, a predetermined third direction and a predetermined fourth direction in a state where a voltage is applied between the pixel electrode and the common electrode; and any two directions among the first direction, the second direction, the third direction and the fourth direction have a difference that is generally equal to an integral multiple of 90 degrees, wherein the pixel electrode has a plurality of slits formed therein, wherein the plurality of slits iclude a pi rality of first slits formed in a region corresponding to the first liquid crystal domain and extending generally parallel to the first direction, a plurality of second slits formed in a region corresponding to the second crystal domain and extending generally parallel to the second direction, a plurality of third slits formed in a reqion corresponding to the third liquid crystal domain and extending generally parallel to the third direction, and a plurality of fourth slits formed in a region corresponding to the fourth liquid crystal domain and extending generally parallel to the fourth direction, wherein the first substrate further includes a shield common electrode formed of a transparent conductive material, provided with a potential equal to that of the common electrode, and located between the plurality of source lines and the pixel electrode in the thickness direction of the liquid crystal layer, and wherein the shield common electrode includes a solid portion overlapping the plurality of source lines and one end portion and the other end portion among two end portions, in the row direction, of the pixel electrode as seen in a direction normal to a display plane, and also includes a first cutout portion formed across a a region corresponding to the first liquid crystal domain, a region corresponding to the second liquid crystal domain, a region corresponding to the third liquid crystal domain and a region corresponding to the fourth liquid crystal domain in each of the plurality of pixels, the first cutout portion including portions overlapping the plurality of slits as seen in the direction normal to the display plane.

2. The liquid crystal display device of claim 1, wherein the shield common electrode further includes a plurality of second cutout portions each extending from the first cutout portion so as to be partially enclosed by the solid portion, the plurality of second cutout portions overlapping at least a part the plurality of slits, as seen in the direction normal to the display plane.

3. The liquid. crystal display device of claim 2, wherein the plurality of second cutout portions each have a width longer than, or equal to, a width of each of the plurality of slits.

4. The liquid crystal display device of claim 1, wherein at least a part of the plurality of slits each include a main portion and a narrow portion narrower than the main portion, the narrow portion overlapping the solid portion of the shield common electrode as seen in the direction normal to the display plane.

5. The liquid crystal display device of claim 4, wherein in each of the plurality of pixels, the first liquid crystal domain, the second liquid crystal domain, the third liquid crystal domain and the fourth liquid crystal domain are located in four rows by one column.

6. The liquid crystal display device of claim 5,
wherein a portion of a plurality of edges of the pixel electrode, that is close to the first liguid crystal domain includes a first edge portion, regarding which an azimuth angle direction perpendicular to the first edge portion and directed toward an internal region of the pixel electrode makes an angle exceeding 90 degrees with the first direction, wherein a portion of the plurality of edges of the pixel electrodes that is close to the second liquid crystal domain includes a second edge portion, regarding which an azimuth angle direction perpendicular to the second edge portion and directed toward the internal reion of the pixel electrode makes an angle exceeding 90 degrees with the second direction, wherein a portion of the plurality of edges of the pixel electrode, that is close to the third liquid crystal domain includes a third edge portion, regarding which an azimuth angle direction perpendicular to the third edge portion and directed toward the internal region of the pixel electrode makes an angle exceeding 90 degrees with the third direction, wherein a portion of the plurality of edges of the pixel electrode, that is close to the fourth liquid crystal domain includes a fourth edge portion, regarding which an azimuth angle direction perpendicular to eou edge portion and directed toward the internal region of the pixel electrode makes an angle exceeding 90 degrees with the fourth direction, and wherein the first edge portion, the second edge portion, the third edge portion and the fourth edge portion are each located in the one end portion or the other end portion, in the row direction, of the pixel electrode.

7. The liquid crystal display device of claim 6,
wherein the plurality of first slits include a slit including the narrow portion on the side of the first edge portion and a slit including the narrow portion on a side opposite to the first edge portion, wherein plurality of second slits include a slit including the narrow portion on the side of the second edge portion and a slit including the narrow portion on a side opposite to the second edge portion, wherein the plurality of third slits include a slit including the narrow portion on the side of the third edge portion and a slit including the narrow portion on a side opposite to the third edge portion, and wherein the plurality of fourth slits include a slit including the narrow portion on the side of the fourth edge portion and a slit including the narrow portion on a side opposite to the fourth edge portion.

8. The liquid crystal display device of claim 6,
wherein the plurality of first slits include a slit including the narrow portion the side of the first edge portion, but do not include any slit including the narrow portion on a side opposite to the first edge portion, wherein the plurality of second slits include a slit including the narrow portion on the side of the second edge portion, but do not include any slit including the narrow portion on a side opposite to the second edge portion, wherein the plurality of third slits include a slit including the narrow portion on the side of the third edge portion, but do not include any slit including the narrow portion on a side opposite to the third edge portion, and wherein the plurality of fourth slits include a slit including the narrow portion on the side of the fourth edge portion, but do not include any slit including the narrow portion on a side opposite to the fourth edge portion.

9. The liquid crystal display device of claim 1, wherein in each of the plurality of pixels, the first liquid crystal domain, the second liquid crystal domain, the third liquid crystal domain and the fourth liquid crystal domain are located in two rows by two columns.

10. The liquid crystal display device of claim 1, wherein the first alignment film and the second alignment film are each a photo alignment film.

11. The liguid crystal display device of claim 1, wherein in each of the first liquid crystal domain, the second liquid crystal domain, the third liquid crystal domain and the fourth liquid crystal domain, a pretilt direction defined by the first alignment film and a pretilt direction defined by the second alignment film are generally antiparallel to each other.

12. The liquid crystal display device of claim 1, further comprising an alignment sustaining layer formed of a photopolymerized material on a surface, of each of the first alignment film and the second alignment film, closer to the liquid crystal layer, the alignment sustaining layer defining a pretilt direction of the liquid crystal molecules in a state where no voltage is applied to the liquid crystal layer.

* * * * *